US009288347B2

United States Patent
Fukuoh et al.

(10) Patent No.: US 9,288,347 B2
(45) Date of Patent: Mar. 15, 2016

(54) JOB SETTING REGISTRATION DEVICE, IMAGE PROCESSING APPARATUS, TANGIBLE COMPUTER-READABLE RECORDING MEDIUM AND METHOD FOR REGISTERING JOB SETTING

(75) Inventors: Chohiko Fukuoh, Tokyo (JP); Masaki Kakutani, Kanagawa (JP); Shuichi Kawashima, Tokyo (JP)

(73) Assignee: KONICA MINOLTA BUSINESS TECHNOLOGIES, INC. (JP)

( * ) Notice: Subject to any disclaimer, the term of this patent is extended or adjusted under 35 U.S.C. 154(b) by 232 days.

(21) Appl. No.: 13/593,438

(22) Filed: Aug. 23, 2012

(65) Prior Publication Data

US 2013/0050731 A1    Feb. 28, 2013

(30) Foreign Application Priority Data

Aug. 25, 2011 (JP) ................. 2011-184010

(51) Int. Cl.
*G06F 3/12* (2006.01)
*H04N 1/00* (2006.01)

(52) U.S. Cl.
CPC .......... *H04N 1/00474* (2013.01); *G06F 3/1205* (2013.01); *G06F 3/1258* (2013.01); *G06F 3/1285* (2013.01); *H04N 1/00413* (2013.01); *H04N 1/00482* (2013.01); *H04N 1/00517* (2013.01); *H04N 1/00477* (2013.01); *H04N 2201/0094* (2013.01)

(58) Field of Classification Search
CPC ..... G06K 15/02; G06F 3/1258; G06F 3/1285; G06F 3/1205; H04N 1/00482

USPC ........................ 358/1.13, 1.15, 1.16
See application file for complete search history.

(56) References Cited

U.S. PATENT DOCUMENTS

| 5,669,040 A | 9/1997 | Hisatake |
| 2001/0013954 A1 | 8/2001 | Nagai et al. |
| 2005/0036170 A1* | 2/2005 | Okuoka et al. ............... 358/1.16 |
| 2006/0250645 A1* | 11/2006 | Miyazaki ..................... 358/1.15 |
| 2009/0046057 A1* | 2/2009 | Umezawa ..................... 345/156 |
| 2009/0213403 A1* | 8/2009 | Sojian ........................... 358/1.13 |
| 2009/0237720 A1* | 9/2009 | Asano ........................... 358/1.15 |

FOREIGN PATENT DOCUMENTS

| JP | 08-202210 | 9/1996 |
| JP | 08-307583 | 11/1996 |

(Continued)

OTHER PUBLICATIONS

Notice of the Reason for Refusal issued by JPO for JP 2011-184010, mailed Dec. 3, 2013, 2 pgs.

(Continued)

*Primary Examiner* — Martin Mushambo
(74) *Attorney, Agent, or Firm* — Squire Patton Boggs (US) LLP

(57) ABSTRACT

Disclosed is a job setting registration device including: a job setting selection receiving unit to receive a selection instruction for selecting a job setting to be registered as a registered job setting for enabling the job setting to be reset by retrieving the job setting, from among job settings of a plurality of jobs which are currently executed in parallel by a predetermined image processing apparatus; and a registered job setting storing unit to store the selected job setting as the registered job setting in accordance with the selection instruction received by the job setting selection receiving unit.

20 Claims, 21 Drawing Sheets

(56) References Cited

FOREIGN PATENT DOCUMENTS

| | | |
|---|---|---|
| JP | 11-024511 | 1/1999 |
| JP | 2001-251454 | 9/2001 |
| JP | 2009-141655 | 6/2009 |

OTHER PUBLICATIONS

Translation of Notice of the Reason for Refusal issued by JPO for JP 2011-184010, mailed Dec. 3, 2013, 5 pgs.

\* cited by examiner

FIG.8

| Name | Status | Available to register |
|---|---|---|
| Job2 | Printing | Yes |
| Job3 | Print Wait | No |

29 Home  
30 Please select a job to be registered.  
40 List

FIG.9

| Name | Status | Available to register |
|---|---|---|
| Job3 | Printing | No |
| Job4 | Fax Transmitting | Yes |

29 Home  
30 Please select a job to be registered.  
40 List

| JOB PARAMETER | CANDIDATE FOR REGISTERED NAME | CANDIDATE FOR ICON |
|---|---|---|
| • 2In1 Job | User1_Pro1_2In1 | |
| • Punch Staple Job | User2_Pro4_Punch Staple | |

JOB SETTING REGISTRATION DEVICE, IMAGE PROCESSING APPARATUS, TANGIBLE COMPUTER-READABLE RECORDING MEDIUM AND METHOD FOR REGISTERING JOB SETTING

BACKGROUND OF THE INVENTION

1. Field of the Invention

The present invention relating to a job setting registration device, an image processing apparatus, a tangible computer-readable recording medium and a method for registering a job setting, for registering a job setting of an active job which is currently executed.

2. Description of Related Art

In an image processing apparatus having a copy function and the like, for example, by setting a copy condition, such as zoom, sheet size, the number of copies and the like, as a job setting, and by executing a job having the job setting, the intended copy is carried out.

Further, in the image processing apparatuses in which only one job is executed at one time, so-called single job compliant image processing apparatuses, there is one for registering the job setting of the job when the job is currently executed, in order to omit the resetting of the job setting which is frequently used by a user from scratch every when the job is executed. According to this image processing apparatus, by only retrieving the registered job setting, it is possible to execute the job. Because the number of the active job is only one, the job setting to be registered can be easily specified. In the specification, the term "active job" means a job which is currently executed. Therefore, the job setting of the job can be registered by a simple operation (for example, see Japanese Patent Application Publication No. 11-24511).

In recent years, image processing apparatuses which can execute a plurality of jobs at one time, so-called multijob compliant image processing apparatuses are mainly used. In the multijob compliant image processing apparatus, while one job is executed, another job can be input and executed. Therefore, in the multijob compliant image processing apparatus, a plurality of active jobs can exist. In case that the above job setting registration which is carried out in the single job compliant image processing apparatus is directly applied to the multijob compliant image processing apparatus, because there are a plurality of active jobs, the job setting to be registered cannot be easily specified among a plurality of jobs.

Further, in the multijob compliant image processing apparatus, most of a plurality of active jobs (for example, a plurality of input jobs except the latest job) are executed in the background. However, in the above job setting registration, it is not assumed that the job setting of the job which is executed in the background is registered as the registered job setting. Therefore, in case that the job is executed in the background, the job setting of the job executed in the background cannot be registered as the registered job setting.

SUMMARY

To achieve at least one of the abovementioned objects, a job setting registration device reflecting one aspect of the present invention comprises:

a job setting selection receiving unit to receive a selection instruction for selecting a job setting to be registered as a registered job setting for enabling the job setting to be reset by retrieving the job setting, from among job settings of a plurality of jobs which are currently executed in parallel by a predetermined image processing apparatus; and a registered job setting storing unit to store the selected job setting as the registered job setting in accordance with the selection instruction received by the job setting selection receiving unit.

Preferably, the job setting registration device further comprises:

a display unit; and a display control unit to control the display unit so as to display selection information used for selecting the job setting when the job setting selection receiving unit receives the selection instruction.

Preferably, at least one job of the plurality of jobs is a job associated with a scan operation for optically reading an original, the display control unit controls the display unit so as to display a registration button for registering a job setting of the one job associated with the scan operation while the scan operation is in progress, and the job setting selection receiving unit receives the selection instruction by pushing the registration button.

Preferably, at least one job of the plurality of jobs is a job associated with a scan operation for optically reading an original, the job setting selection receiving unit receives a display instruction for displaying the selection information relating the one job associated with the scan operation at least during a time period which elapses since the scan operation is finished until the one job is finished, the display control unit controls the display unit so as to display the selection information relating to the one job in accordance with the display instruction, and the registered job setting storing unit stores the job setting of the one job as the registered job setting when the job setting selection receiving unit receives the selection instruction for selecting the one job from the selection information relating to the one job, which is displayed by the display unit.

Preferably, the job setting registration device further comprises:

a job setting registration judging unit to judge whether the job setting is prohibited from being registered as the registered job setting, and to prohibit the job setting from being registered as the registered job setting when the job setting registration judging unit judges that the job setting is prohibited.

Preferably, the display control unit controls the display unit so as to display an indication for prompting a user to register the job setting of the job which is currently executed as the registered job setting when the image processing apparatus can receive a new job.

Preferably, when the job is currently executed in a background in a state that the job setting selection receiving unit does not receive the selection instruction for selecting the job setting of the job which is currently executed, the registered job setting storing unit stores the job setting of the job as a provisional registered job setting, in case that the job having the job setting stored as the provisional registered job setting is executed by retrieving the job setting from the registered job setting storing unit before a predetermined time period elapses since the job setting is stored as the provisional registered job setting, the provisional registered job setting is stored as the registered job setting, and in case that the job having the job setting stored as the provisional registered job setting is not executed by retrieving the job setting from the registered job setting storing unit before the predetermined time period elapses since the job setting is stored as the provisional registered job setting, the provisional registered job setting is deleted from the registered job setting storing unit.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIG. 8 is an example of the display window showing the list of the selection information relating to the jobs in case that the job "Job2" and the job "Job3" are currently executed;

FIG. 9 is an example of the display window showing the list of the selection information relating to the jobs in case that the job "Job3" and the job "Job4" are currently executed;

DETAILED DESCRIPTION OF PREFERRED EMBODIMENT

Hereinafter, a preferred embodiment of the present invention will be explained with reference to the accompanying drawings.

Figure 1:
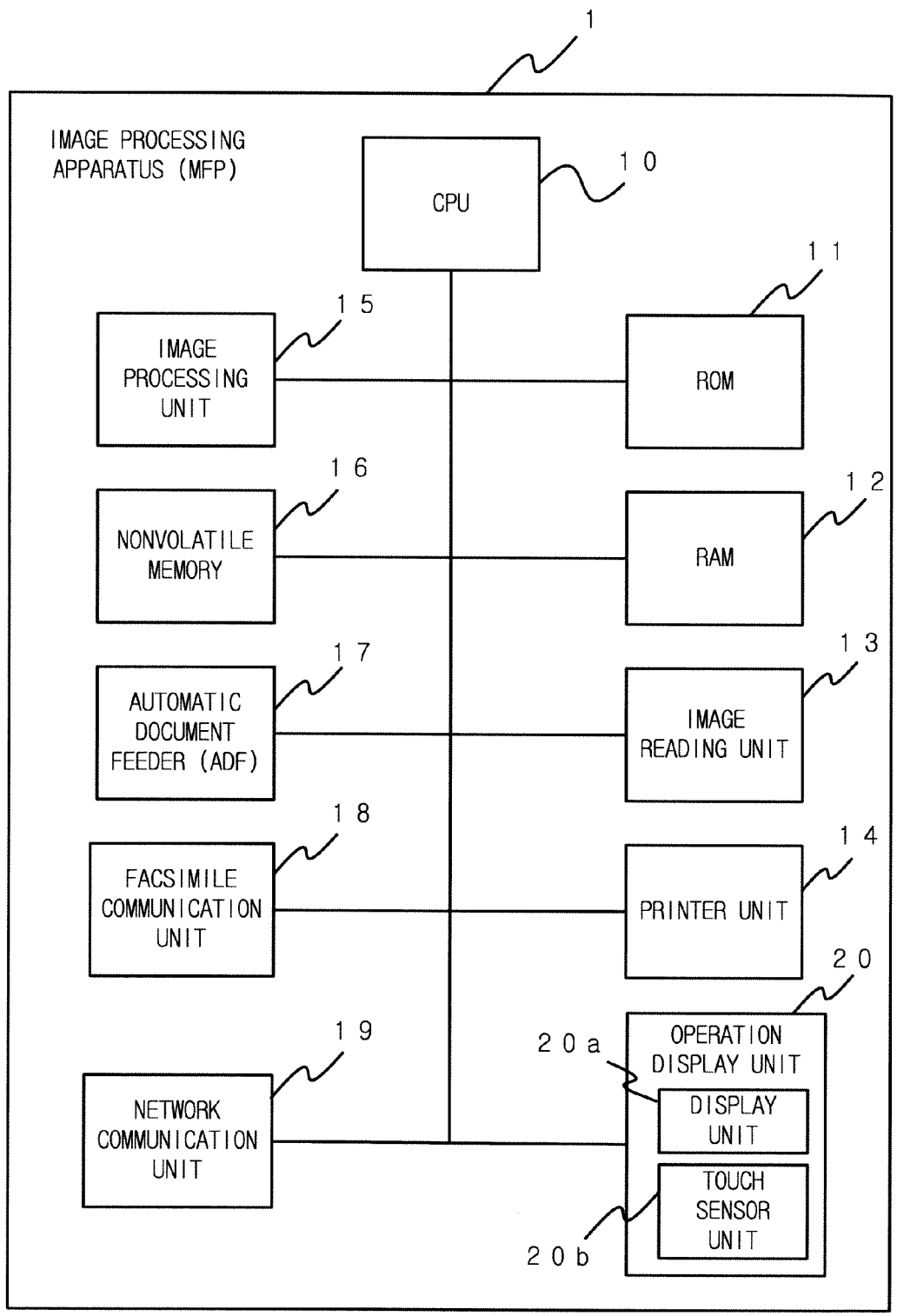
FIG. 1 is a block diagram showing a schematic configuration of the image processing apparatus according to the embodiment.

FIG. 1 is a block diagram showing the schematic configuration of the image processing apparatus (MFP) 1 according to the embodiment. The image processing apparatus 1 comprises a CPU (Central Processing Unit) 10 for controlling the whole operation of the image processing apparatus 1, a ROM (Read Only Memory) 11, a RAM (Random Access Memory) 12, an image reading unit 13, a printer unit 14, an image processing unit 15, a nonvolatile memory 16, an automatic document feeder (ADF) 17, a facsimile communication unit 18, a network communication unit 19 and an operation display unit 20, which are connected with the CPU 10.

By the CPU 10, a middleware, application programs and the like are executed on an OS (Operating System) program as a base. Further, the CPU 10 executes the control relating to the job setting registration operation for registering the job setting of the job which is currently executed in the image processing apparatus 1. The above job setting registration operation will be explained below.

In the ROM 11, various types of programs are stored. By executing the processes by the CPU 10 in accordance with these programs, the functions of the image processing apparatus 1 are realized. Further, in the ROM 11, a program for executing the control relating to the job setting registration operation for registering the job setting of the job which is currently executed.

The RAM 12 is used as a work memory for temporarily storing various data when the CPU 10 executes the process in accordance with the programs and as an image memory for storing image data.

The image reading unit 13 has a function to obtain the image data by optically reading an original. That is, the image reading unit 13 has the scanning function. For example, the image reading unit 13 comprises a light source for irradiating the original with light, a line image sensor for reading the original line by line in the width direction of the original by receiving the reflected light from the original, a moving unit for sequentially moving the reading position line by line in the longitudinal direction of the original, an optical system having lenses, mirrors and the like for guiding the reflected light from the original to the line image sensor and focusing the reflected light on the line image sensor, a converting unit for converting an analog image signal outputted from the line image sensor into digital image data, and the like.

The printer unit 14 has a function to form an image based on image data, on recording paper. That is, the printer unit 14 has the printing function. In this embodiment, the printer unit 14 is configured as the so-called laser printer for forming an image by the electrophotographic process. The laser printer comprises a conveying device for the recording paper, a photoconductive drum, a charging device, a laser unit, a developing device, a transfer and separation device, a cleaning device and a fixing device. The image may be formed by the inkjet system or another system.

The image processing unit 15 carries out the rasterization processing for converting print data into image data, compression/decompression processing of image data and the like, in addition to the processings, such as enlargement/reduction and rotation of the image.

The nonvolatile memory 16 is a rewritable memory (flash memory) in which the stored contents are not damaged even if the image processing apparatus 1 is turned off, and is used for storing various types of setting information and the like. Further, when the job setting of the active job is registered as the registered job setting, the job setting is stored in the nonvolatile memory 16.

The automatic document feeder (ADF) 17 has a function to convey the original set to the original feed tray sheet by sheet from the top sheet of the original, pass the original through the reading position of the image reading unit 13 and discharge the original to the predetermined discharge position.

The facsimile communication unit 18 receives and transmits image data from/to an external device having a facsimile function via a public line.

The network communication unit 19 communicates data with a terminal device or other external devices via a network, such as LAN (Local Area Network).

The operation display unit 20 comprises a display unit 20a and a touch sensor unit 20b. The display unit 20a is configured by a liquid crystal display (LCD) or the like, and has a function to display various type of operation windows, setting windows and the like. Further, the display unit 20a displays the setting window for inputting the job to the image processing apparatus 1 and for registering the job setting of the job.

The touch sensor unit 20b is provided on the screen of the display unit 20a and has a touch panel for setting the job to the image processing apparatus 1 and registering the job setting by pushing the screen through the use of a touch pen, a user's finger or the like. Further, the operation display unit 20 comprises hardware keys for inputting instructions to the image processing apparatus 1.

Figure 2A:
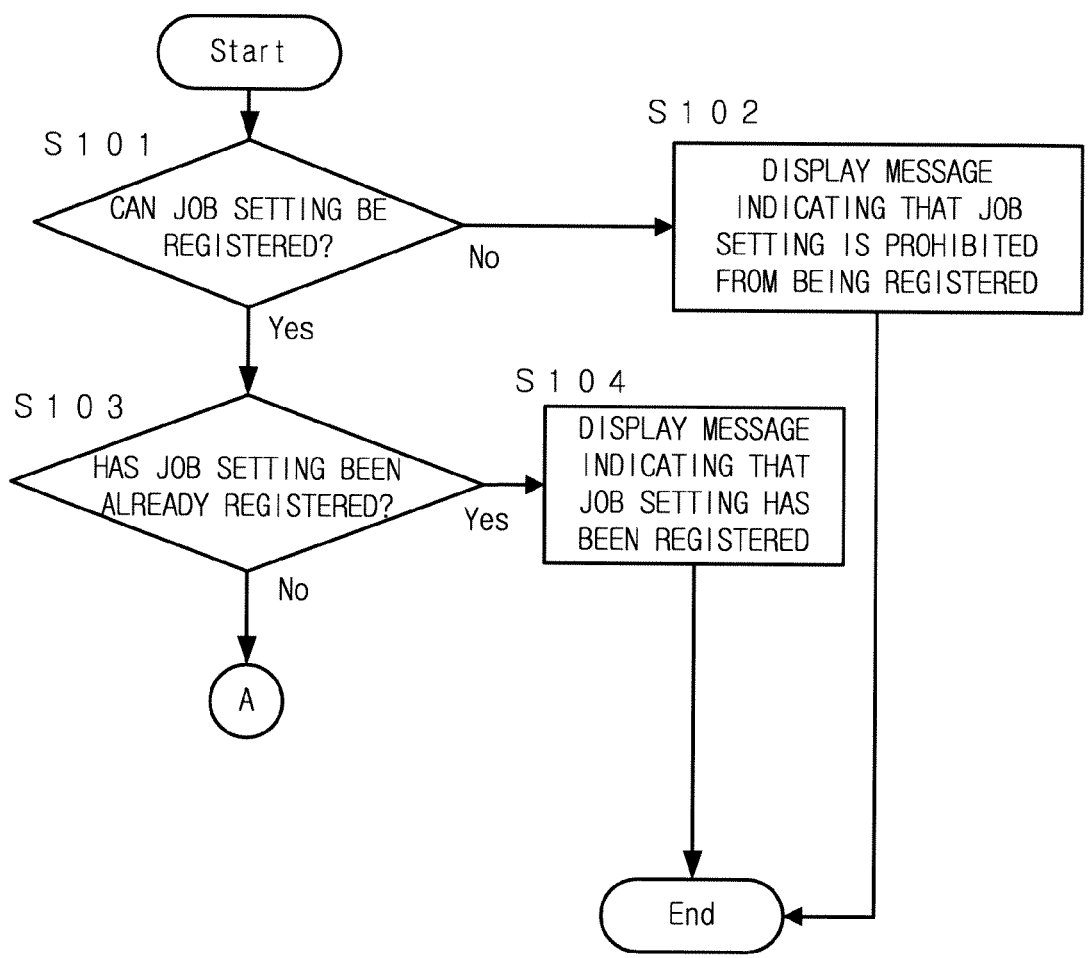
FIGS. 2A and 2B are a flowchart relating to the job setting registration operation for registering the job setting of the active job in the image processing apparatus.
Figure 2B:
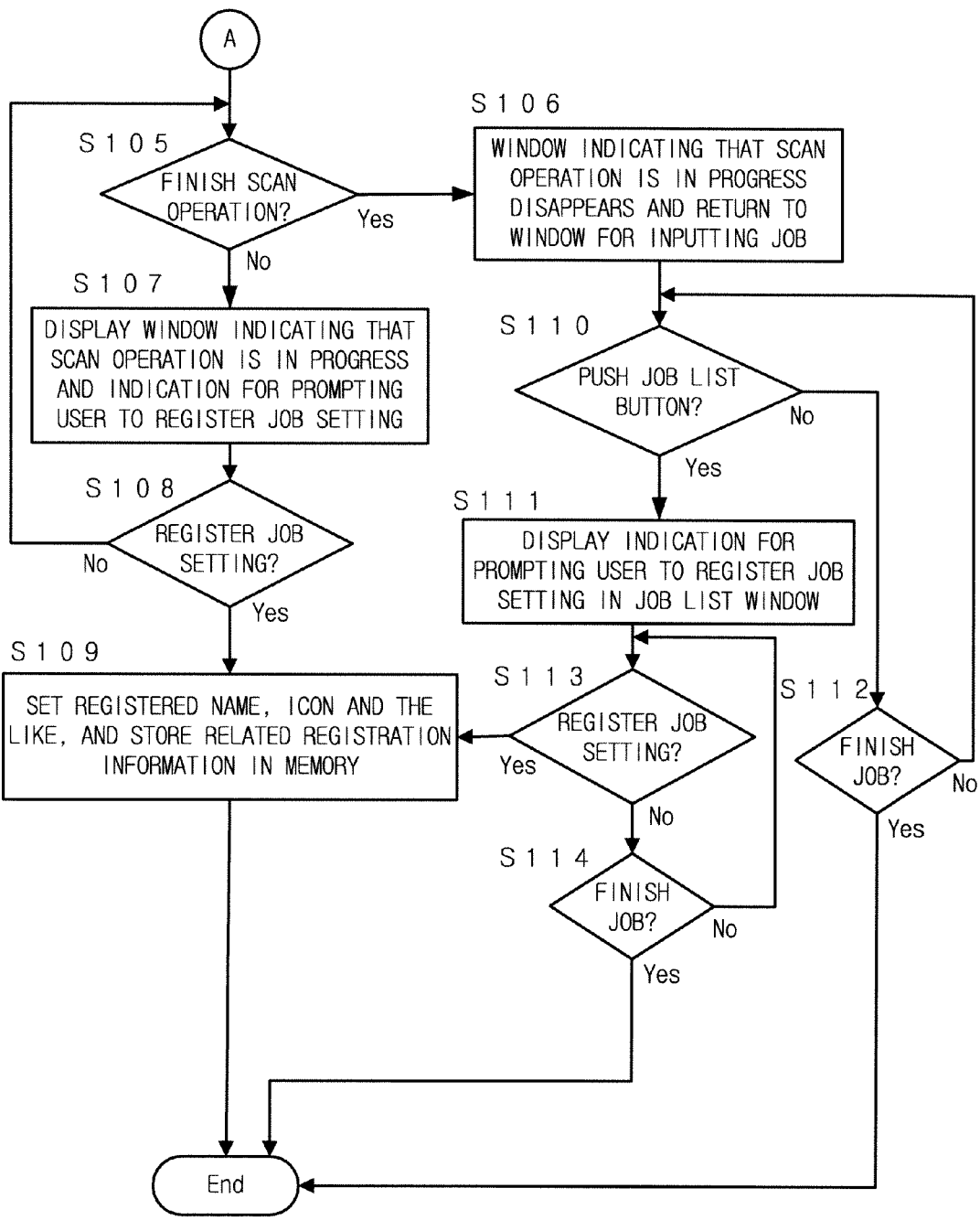

FIGS. 2A and 2B are a flowchart relating to the job setting registration operation for registering the job setting of the active job in the image processing apparatus 1. In the flowchart, the job setting registration operation for registering the job setting of the job associated with the scan operation as the registered job setting is mainly shown. The job associated with the scan operation is a job requiring the scan operation for the original while the job is executed, for example, a job in which the image data of the original is obtained by scanning the original to copy the original in accordance with the obtained image data.

The registered job setting means the job setting which is stored in the nonvolatile memory 16 or the like and which can be reset by retrieving the stored job setting from the nonvolatile memory 16 or the like.

Firstly, when the job is input to the image processing apparatus 1, the CPU 10 judges whether the job setting of the input job can be registered as the registered job setting or whether the job setting is prohibited from being registered as the registered job setting (Step S101). The jobs input to the image processing apparatus 1 includes the job input from the operation display unit 20 and the job input from an external PC or the like via the network communication unit 19.

When the CPU 10 judges that the job setting of the input job is a job setting which is prohibited from being registered as the registered job setting (Step S101; No), the message indicating that the job setting cannot be registered as the registered job setting is displayed in the display unit 20a (Step S102). Then, the control relating to the job setting registration operation for this job setting is ended.

The job setting which is prohibited from being registered as the registered job setting includes a job setting of a job input from an external device via the network communication unit 19, for example, a job setting of a job relating to the print of document data or the like transmitted from an external PC or the like. In the job setting of the job input from an external device, the parameters unique to the external device are often used unlike the job setting of the job input from the operation display unit 20. Even though the job setting of the job input from an external device is stored in the nonvolatile memory 16, the image processing apparatus 1 cannot usually use the parameters of the above stored job setting. Therefore, the job setting of the job input from an external device is prohibited from being registered as the registered job setting.

When the CPU 10 judges that the job setting of the input job is a job setting which can be registered as the registered job setting (Step S101; Yes), the CPU 10 judges whether the above job setting has been already stored in the nonvolatile memory 16, that is, whether the above job setting has been registered as the registered job setting (Step S103).

In case that the CPU 10 judges that the above job setting has been registered as the registered job setting (Step S103; Yes), the message indicating that this job setting has been registered as the registered job setting is displayed in the display unit 20a (Step S104). Then, the control relating to the job setting registration operation for this job setting is ended.

In case that the CPU 10 judges that the above job setting has not been registered as the registered job setting (Step S103; No), the process proceeds to Step S105. In Step S105, in case that the job input to the image processing apparatus 1 is a job associated with the scan operation, the CPU 10 judges whether the scan operation is finished or not.

When the CPU 10 judges that the scan operation is not finished (Step S105; No), the massage indicating that the scan operation is in progress is displayed in the display unit 20a. Further, the indication for prompting the user to register the job setting of the job associated with the scan operation as the registered job setting is displayed in the display unit 20a (Step S107). At this time, the job setting registration button 36 (See FIG. 3C) for registering the job setting of the job associated with the scan operation is displayed in the display unit 20a. The touch sensor unit 20b receives the user's instruction for registering the above job setting as the registered job setting by pushing the job setting registration button 36.

In case that the CPU 10 judges that the touch sensor unit 20b detects the push of the job setting registration button 36 (Step S108; Yes), the registered name, the icon and the like of the job setting are set and the job setting is stored in the nonvolatile memory 16 with the related registration information, such as the registered name, the icon and the like (Step S109). Thereby, the job setting is registered as the registered job setting. The control relating to the job setting registration operation for this job setting is ended.

In case that the CPU 10 judges that the touch sensor unit 20b does not detect the push of the job setting registration button 36 (Step S108; No), the process returns to Step S105. Until the scan operation is finished, the massage indicating that the scan operation is in progress is displayed in the display unit 20a. Further, the indication for prompting the user to register the job setting of the job associated with the scan operation as the registered job setting is displayed in the display unit 20a (Step S107). Then, the CPU 10 monitors the push of the job setting registration button 36.

When the scan operation is finished in the state that the job setting is not registered (Step S105; Yes), in the display unit 20a, the message indicating that the scan operation is in progress is deleted. Further, the window for inputting a new job is displayed (Step S106). At this time, the job in which the scan operation is finished is executed in the background. For example, the print operation for printing an image in accordance with the image data obtained by the above scan operation is carried out in the background.

When the window for inputting a new job is displayed, the CPU 10 judges whether the touch sensor unit 20b detects that the list button 40 (See FIG. 4C) for displaying the job which is executed in the background is pushed (Step S110). At this time, the touch sensor unit 20b receives the user's instruction for displaying the information relating to the job which is executed in the background by the push of the list button 40.

When the CPU 10 judges that the touch sensor unit 20b does not detect the push of the list button 40 (Step S110; No), the CPU 10 judges whether the job which is executed in the background is finished or not (Step S112). In case that the CPU 10 judges that the above job is not finished (Step S112; No), the process returns to Step S110. The CPU 10 monitors the push of the list button 40 until the job is finished.

When the job which is executed in the background is finished without detecting the push of the list button 40 by the touch sensor unit 20b (Step S112; Yes), the job setting of the job is not registered as the registered job setting. Then, the control relating to the job setting registration operation for this job setting is finished.

Further, when the CPU 10 judges that the touch sensor unit 20b detects the push of the list button 40 before the job which is executed in the background is finished (Step S110; Yes), the selection information relating to the above job is displayed as a list in the display unit 20a. Further, the indication for prompting the user to register the job setting of the above job as the registered job setting is displayed (Step S111). At this time, the touch sensor unit 20b receives the selection of the selection information relating to the above job in order to register the job setting of the above job which is executed in the background as the registered job setting.

When the CPU 10 judges that the touch sensor 20b detects the selection of the selection information displayed in the list (Step S113; Yes), the process proceeds to Step S109. At this time, the registered name, the icon and the like of the job setting to be registered are set and the job setting is stored in the nonvolatile memory 16 with the related registration information, such as the registered name, the icon and the like of the job setting. Thereby, the job setting is registered as the registered job setting. The control relating to the job setting registration operation for this job setting is ended.

When the CPU 10 judges that the touch sensor unit 20b does not detect the selection of the selection information displayed in the list (Step S113; No), the CPU 10 judges whether the above job is finished or not (Step S114). In case that the CPU 10 judges that the above job is not finished (Step S114; No), the process returns to Step S113. Until the above job is finished, the touch sensor unit 20b receives the selection of the selection information relating to the above job which is executed in the background.

Further, in case that the job is finished without registering the job setting of the job displayed in the list (Step S114; Yes), the job setting is not registered as the registered job setting. Then, the control relating to the job setting registration operation for this job setting is finished.

FIGS. 3A to 3F are explanatory views showing the change in the display window displayed in the display unit 20a until the job setting of the input job is registered as the registered job setting. Specifically, in FIGS. 3A to 3F, the change in the display window is shown in case that the image data of an original is obtained by scanning the original and the job setting of the job for copying the original in accordance with the obtained image data is registered as the registered job setting while the scan operation for the original is in progress.

Figure 3A:
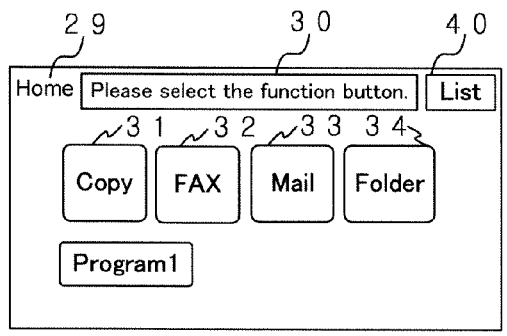
FIGS. 3A to 3F are explanatory views showing the change in the display window displayed in the operation display unit until the job setting of the input job is registered as the registered job setting.

FIG. 3A shows the display window (home window) for selecting one function used for executing the job to be input among various functions (such as copy function, facsimile function and the like) of the image processing apparatus 1. In this display window, a home button 29 for changing the display window of the display unit 20a to the home window, a message box 30, a list button 40, various function buttons and the like are displayed. In the massage box 30, the message "Please select the function button" is displayed. The function buttons include a copy button 31, a facsimile button 32, a mail button 33 and a folder button 34. By pushing one button of these buttons, the function corresponding to the pushed button is used.

Figure 3F:
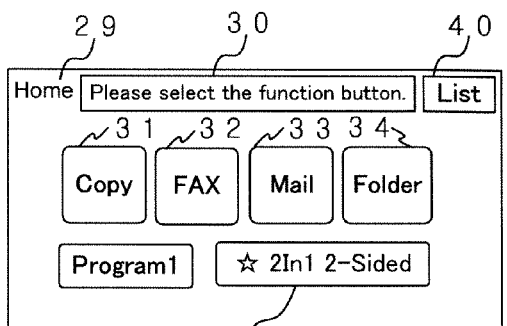
Figure 3B:
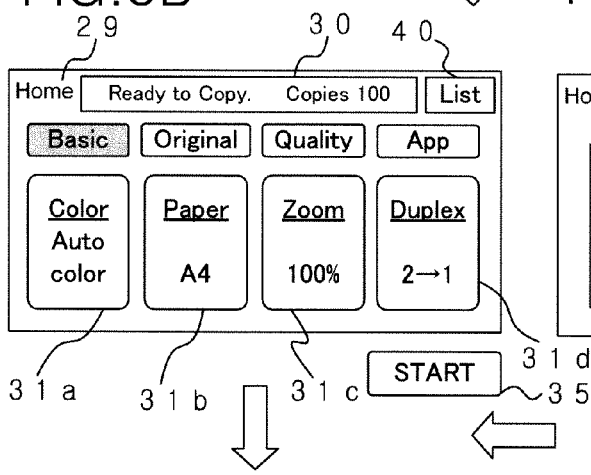

When the copy button 31 is pushed, the display window for inputting a job relating to the copy is displayed as shown in FIG. 3B. In this window, various types of setting buttons relating to the copy, such as a color setting button 31a, a paper size setting button 31b, a zoom setting button 31c and a simplex/duplex setting button 31d are displayed. Various parameters of the job relating to the copy are set by using the above setting buttons via this window. In FIG. 3B, when the original having two sheets in which images are printed on both sides is copied, the parameters "copies 100", "2In1 (meaning that images of two pages are printed on one sheet of recording paper)", "2→1 (meaning that images are printed on one side of the recording paper when the original in which the images are printed on both sides of the paper is copied)" are set by a user. With respect to the remaining parameters, the default values which are previously set in the image processing apparatus 1 (for example, the print using the A4 paper, "zoom 100%" and the like) are used.

Various parameters of the job are set in the window shown in FIG. 3B. When the start button 35 is pushed in the state that the original is set to the original feed tray of the image processing apparatus 1, the scan operation which is carried out for the original by the image reading unit 13 is started. At this time, the window shown in FIG. 3C is displayed.

Figure 3E:
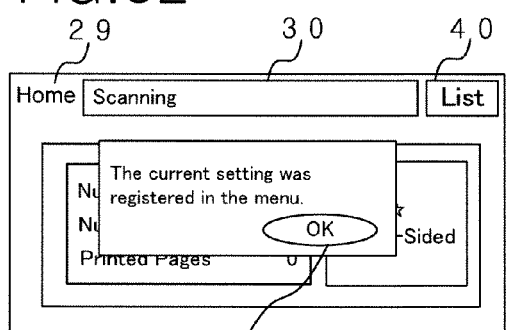
Figure 3C:
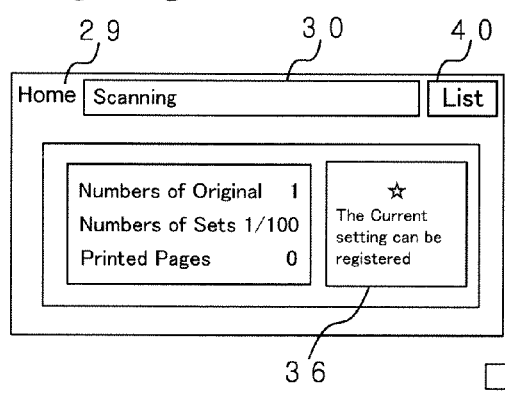

In the window shown in FIG. 3C, the massage indicating that the scan operation for the original is in progress is displayed in the message box 30. Further, in the window of FIG. 3C, the job setting registration button 36 for registering the job setting set in the window of FIG. 3B as the registered job setting is displayed. In the job setting registration button 36, the information for specifying the job setting which is registered by pushing the registration button 36, such as the message indicating that the job setting which is registered by pushing the registration button 36 is the latest job setting (current setting), that is, the information relating to the job setting is displayed. The job setting registration button 36 has a function to prompt the user to register the job setting as the registered job setting. When the job setting registration button 36 is pushed in order to register the job setting as the registered job setting while the scan operation is carried out, the window shown in FIG. 3D is displayed.

Figure 3D:
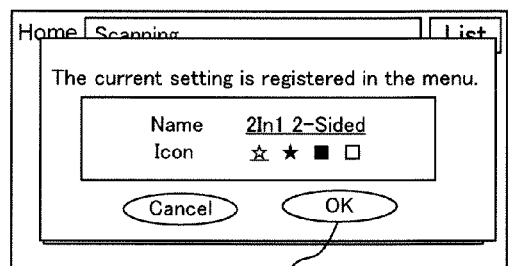

In FIG. 3D, the display window for setting the registered name and the icon of the job setting to be registered is shown. In case of the registered name of the job setting to be registered, the name which reminds the user of the job setting or the like is usually set as the registered name. For example, In case that the parameters 2In1 and 2→1 are set when the job is input, the registered name of the job setting may be set to "2In1 2-Sided". Further, the icon may be optionally set. However, in case that the icon is set according to each user, it is possible to easily recognize the user which registered the job setting. When the registered name and the icon of the job setting are determined by pushing the OK button 37 of the window shown in FIG. 3D, the window shown in FIG. 3E is displayed.

In the window shown in FIG. 3E, the massage indicating that the job setting set in the window of FIG. 3B is registered as the registered job setting with the registered name and the icon of the job setting, which are set in the window of FIG. 3D, is displayed. When it is confirmed that the job setting is registered and the OK button 38 of the window shown in FIG. 3E is pushed, the window of FIG. 3B is displayed.

Further, when the home button 29 displayed in the window of FIG. 3B is pushed, the home window shown in FIG. 3F is displayed.

In the window of FIG. 3F, the program button 39 for retrieving and resetting the registered job setting which is registered in the above job setting registration operation, is added other than various type of buttons displayed in FIG. 3A. In the program button 39, the registered name and the icon which are set in the window of FIG. 3D are displayed.

After the job setting is registered as the registered job setting, by pushing the program button 39 when the job having the same job setting is executed again, the registered job setting is retrieved from the nonvolatile memory 16. Therefore, it is possible to omit the resetting of the job setting which is carried out by the user from scratch every when the same job is executed.

FIGS. 4A to 4F are explanatory views showing the change in the display window displayed in the display unit 20*a* until the job setting of the input job is registered as the registered job setting. Specifically, in FIGS. 4A to 4F, the change in the display window is shown in case that the job setting of the job in which image data of the original is obtained by scanning the original and the original is copied in accordance with the obtained image data, is registered as the registered job setting. Further, the change in the display window is shown in case that after the scan operation for the original is finished, the job setting of the job is registered before the execution of the job is finished.

Figure 4A:
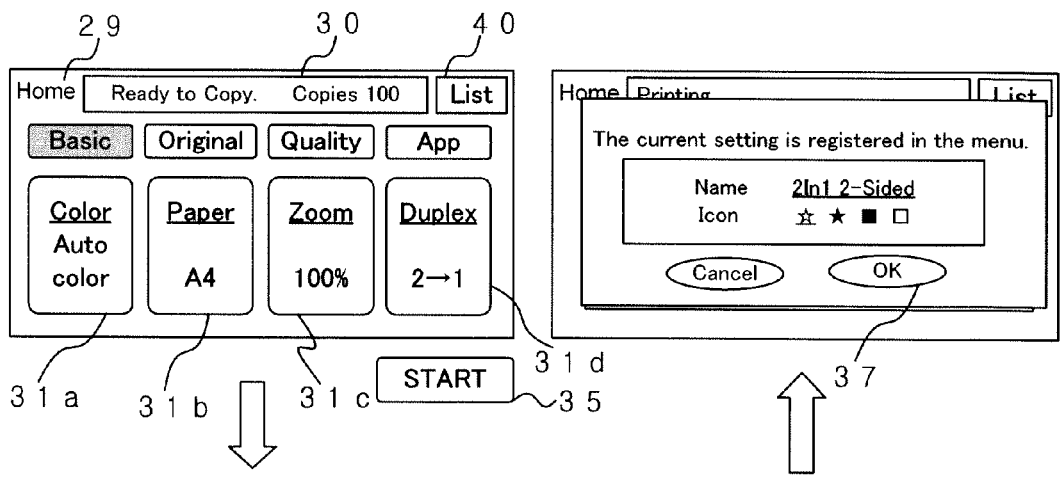
FIGS. 4A to 4F are explanatory views showing the change in the display window displayed in the operation display unit until the job setting of the input job is registered as the registered job setting.

In FIG. 4A, the window for inputting the job relating to the copy is shown. In the window shown in FIG. 4B, the job setting registration button 36 for registering the job setting of the input job as the registered job setting during the scan operation for the original is displayed. The job input in the window of FIG. 4A is the same as the job input in the window of FIG. 3B. FIG. 4A and FIG. 4B are the same as FIG. 3B and FIG. 3C, respectively. Further, the explanation relating to FIG. 4A and FIG. 4B is the same as the explanation relating to FIG. 3B and FIG. 3C. Therefore, the detail explanation relating to FIG. 4A and FIG. 4B is omitted.

Figure 4F:
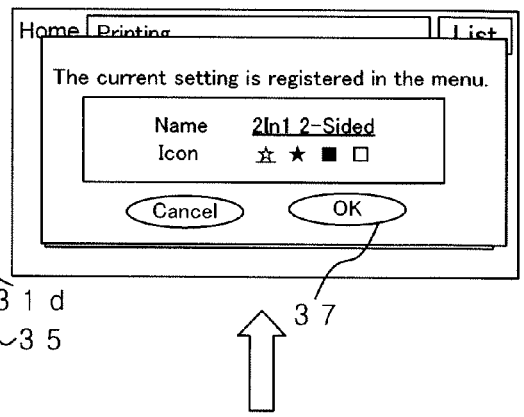
Figure 4B:
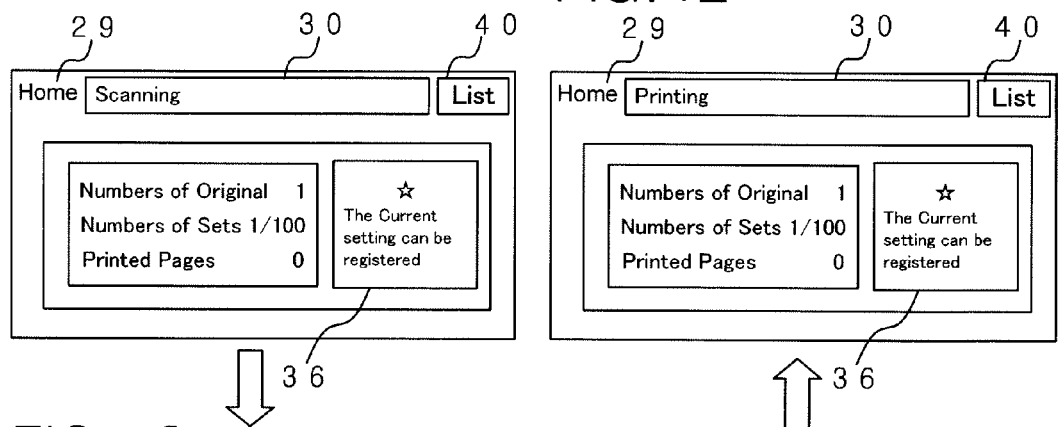
Figure 4E:
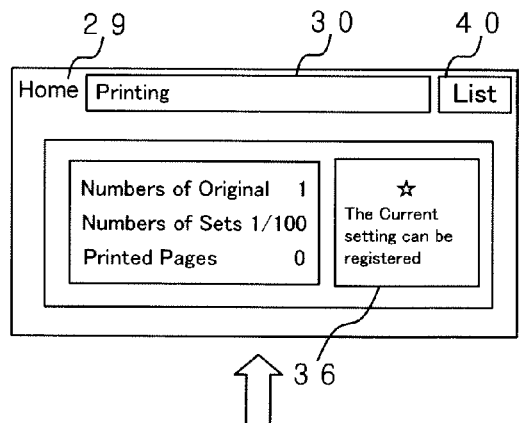
Figure 4C:
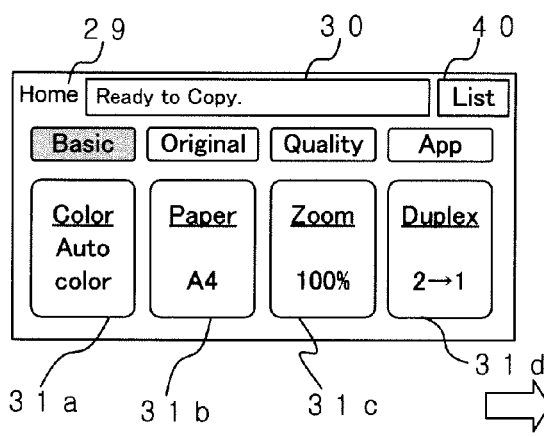

In case that the scan operation for the original is finished without pushing the job setting registration button 36 in the state that job setting registration button 36 is displayed in the window of FIG. 4B, the window for inputting a new job relating to the copy is displayed as shown in FIG. 4C. At this time, in the job in which the scan operation is finished, the print operation is carried out in the background.

Figure 4D:
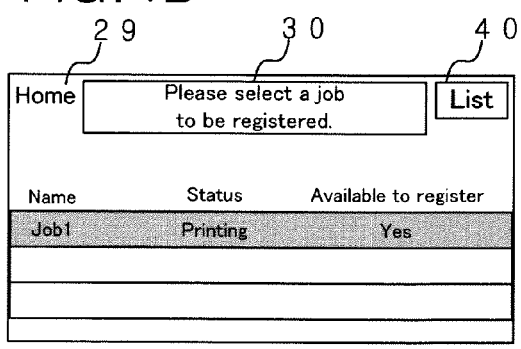

When the list button 40 displayed in the window of FIG. 4C is pushed in the state that the job is executed in the background, the display window shown in FIG. 4D is displayed.

In the window of FIG. 4D, the selection information relating to the active job in the image processing apparatus 1 is displayed as a list. In this list, the information, such as the provisional name, the status and the like of the active job, is displayed. Further, whether the job setting of the active job can be registered as the registered job setting (available to register) is displayed. Incase of the selection information relating to the job displayed in the list of FIG. 4D, the provisional name of the job is "Job1" and the current status of the job is "Printing". With respect to the registrablity of the job setting, the above job setting can be registered (Yes). In the message box 30 in the window of FIG. 4D, the message for prompting the user to select the selection information relating to the job displayed in the list is displayed in order to register the job setting of the active job as the registered job setting. When the job "Job1" is selected in the window of FIG. 4D, the display window shown in FIG. 4E is displayed.

In FIG. 4E, similar to FIG. 3C, the job setting registration button 36 for registering the job setting of the job "Job1" as the registered job setting is displayed. When the job setting registration button 36 is pushed during the execution of the job "Job1", the window is displayed as shown in FIG. 4F.

In FIG. 4F, the display window for setting the registered name and the icon of the registered job setting is shown. FIG. 4F is substantially the same as FIG. 3D. Further, because the explanation relating to FIG. 4F is the same as the explanation relating to FIG. 3D, the detail explanation relating to FIG. 4F is omitted.

After the job setting is registered with the registered name and the icon of the job setting, when the home window is displayed in the display unit 20*a* by pushing the home button 29, the program button 39 for retrieving and resetting the registered job setting which is registered in the above job setting registration operation, is added in the home button like FIG. 3F.

As described above, even though the job is executed in the background, the job setting of the job can be registered as the registered job setting.

Figure 5A:
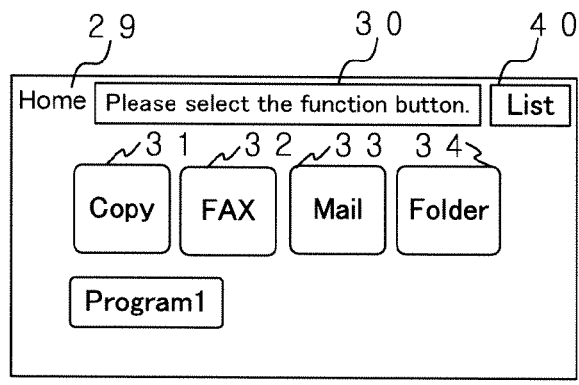
FIGS. 5A to 5C are explanatory views showing the change in the display window displayed in the operation display unit in case that the job setting of the input job has been already registered.
Figure 5B:
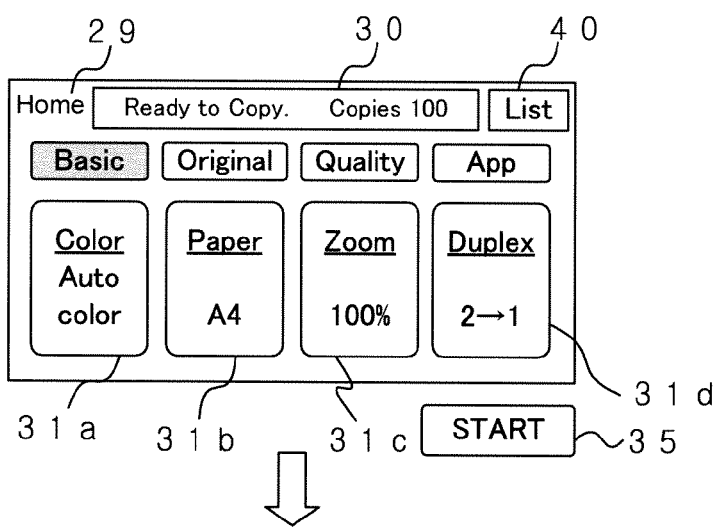
Figure 5C:
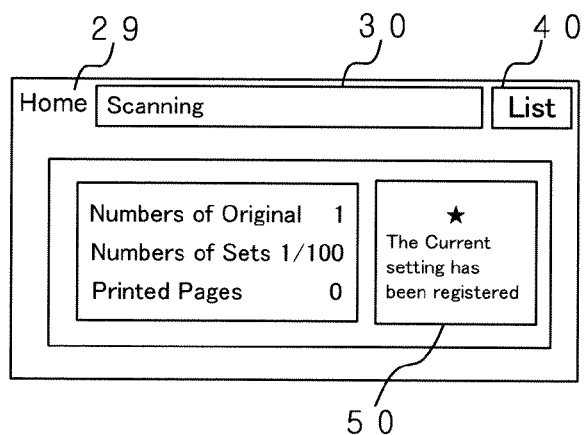

FIGS. 5A to 5C are explanatory views showing the change in the display window displayed in the display unit 20*a* in case that the job setting of the input job has been already registered. Specifically, in FIGS. 5A to 5C, the change in the display window is shown in case that the job setting of the job in which the image data of the original is obtained by scanning the original and the original is copied in accordance with the obtained image data has been already registered as the registered job setting.

FIG. 5A shows the display window (home window) for selecting one function used for executing the job to be input among various functions (such as copy function, facsimile function and the like) of the image processing apparatus 1. In FIG. 5B, the window for inputting the job relating to the copy is shown. The job input in the window of FIG. 5B is the same as the job input in the window of FIG. 3B. FIG. 5A and FIG. 5B are the same as FIG. 3A and FIG. 3B, respectively. The explanation relating to FIG. 5A and FIG. 5B is the same as the explanation relating to FIG. 3A and FIG. 3B. Therefore, the detail explanation relating to FIG. 5A and FIG. 5B is omitted.

In case that the job setting of the job input in the window of FIG. 5B has been already registered as the registered job setting, that is, in case that the parameters of the job set in the window of FIG. 5B are completely the same as the parameters of any job setting stored in the nonvolatile memory 16 as the registered job setting, the window is displayed as shown in FIG. 5C.

In FIG. 5C, in the massage box 50, the message indicating that the job setting of the active job has been already registered as the registered job setting is displayed. Then, in the display unit 20a, the window for inputting the job relating to the copy as shown in FIG. 5B or the home window as shown in FIG. 5A is displayed. The control relating to the job setting registration operation for the job setting of the active job is finished.

Next, the job setting registration operation will be explained in case that when one or more jobs are currently executed in the image processing apparatus 1, another job is input in the image processing apparatus 1.

Figure 6:
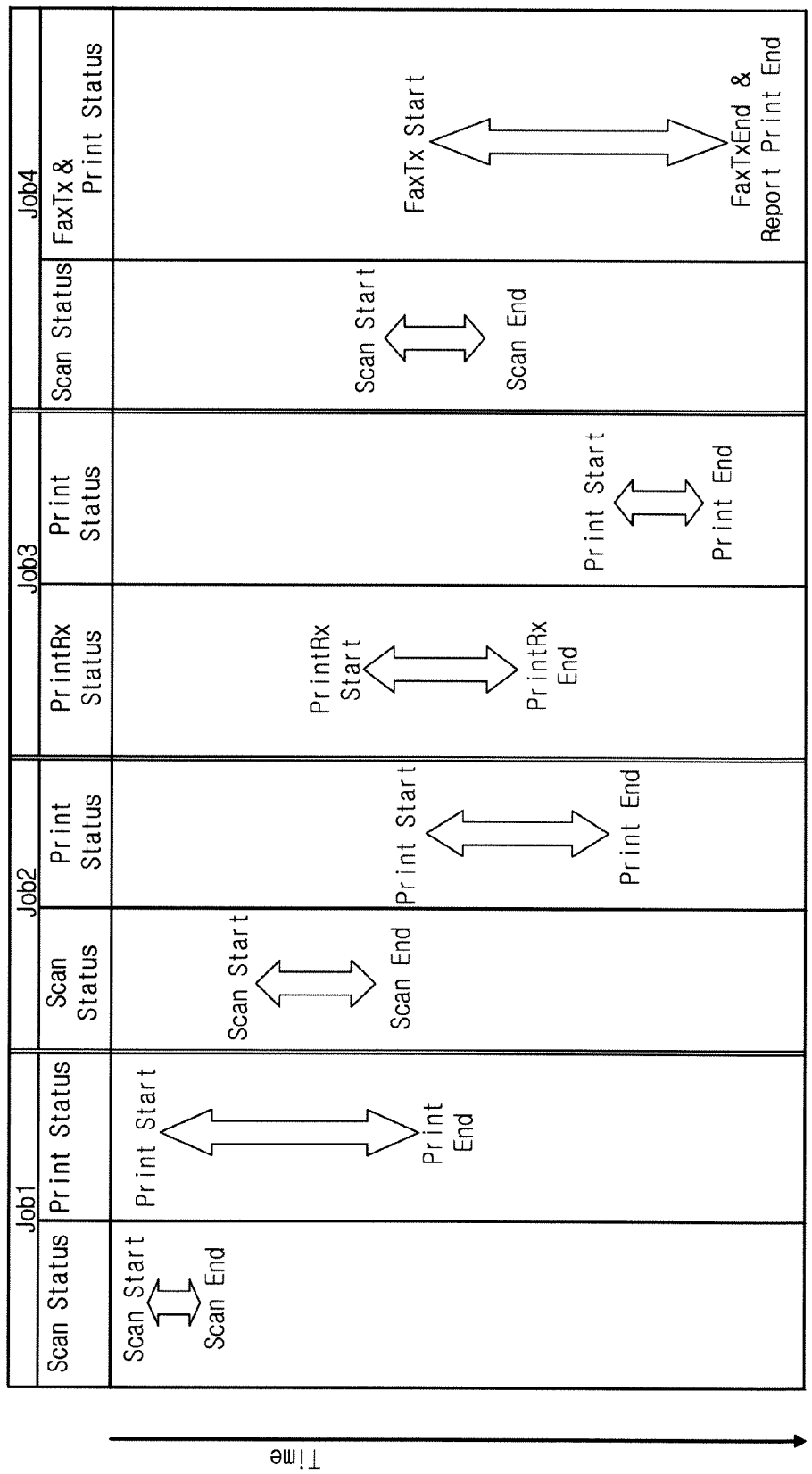
FIG. 6 is a timing diagram showing each status of the jobs "Job1" to "Job4" in time series, which are input in the image processing apparatus.

FIG. 6 is a timing diagram showing each status of the jobs "Job1" to "Job4" in time series, which are input in the image processing apparatus 1. In the explanation relating to the job setting registration operation for registering the job setting of one or more jobs selected from among a plurality of active jobs, which will be explained below, the jobs "Job1" to "Job4" shown in FIG. 6 are used as examples of jobs input in the image processing apparatus 1.

The job "Job1" is a job relating to the copy. In this job, when the original having two sheets in which images are printed on both sides is copied, the parameters "copies 100", "2In1 (meaning that images of two pages are printed on one sheet of recording paper)", "2→1 (meaning that images are printed on one side of the recording paper when the original in which the images are printed on both sides of the paper is copied)" are set by the user via the operation display unit 20. With respect to the remaining parameters, the default values which are previously set in the image processing apparatus 1 are used. The job setting of the job "Job1" can be registered as the registered job setting.

The job "Job2" is a job relating to the copy. In this job, when the original having ten sheets in which images are printed on one side is copied, the parameter "copies 20" is set by the user via the operation display unit 20. With respect to the remaining parameters, the default values which are previously set in the image processing apparatus 1 are used. The job setting of the job "Job2" can be registered as the registered job setting.

The job "Job3" is a job relating to the print of document data transmitted from an external PC. In this job, when the document data having ten pages is printed, the parameter "the number of print 20" is set by the user using the external PC. With respect to the remaining parameters, the default values which are previously set in the external PC are used. Because the job "Job3" is a job input in the external PC, the job setting of the job "Job3" is prohibited from being registered as the registered job setting.

The job "Job4" is a job relating to the facsimile communication. In this job, before the image data of the original having ten sheets is transmitted via the facsimile communication by scanning the original, the specific destination is set as the parameter by the user via the operation display unit 20. With respect to the remaining parameters, the default values which are previously set in the image processing apparatus 1 are used. The job setting of the job "Job4" can be registered as the registered job setting.

In the timing diagram of FIG. 6, the arrow in the "Scan Status" described in each of the jobs "Job1", "Job2" and "Job4" represents the time period for which the scan operation of each job is carried out. The arrow in the "Print Status" described in each of the jobs "Job1", "Job2" and "Job3" represents the time period for which the print operation of each job is carried out. The arrow in the "PrintRx Status" described in the job "Job3" represents the time period for which the image data is transmitted from the PC to the image processing apparatus 1. The arrow in the "FaxTx & Print Status" described in the job "Job4" represents the time period which elapses since the transmission of the image data of the original scanned by the scan operation is started until the image obtained by transmitting the image data is printed by the image processing apparatus 1.

FIGS. 7A to 7F are explanatory views showing the change in the display window displayed in the display unit 20a in case that while the job "Job1" is currently executed, the job "Job2" is input in the image processing apparatus 1 and the job setting of the job "Job2" is registered as the registered job setting.

Figure 7A:
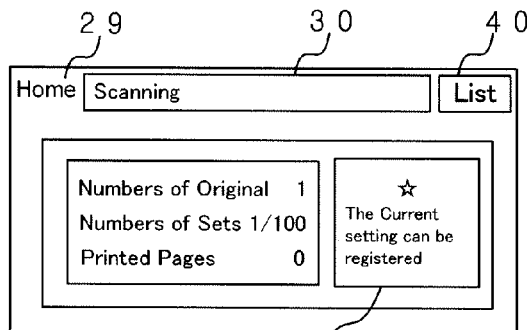
FIGS. 7A to 7F are explanatory views showing the change in the display window displayed in the operation display unit in case that while the job "Job1" is currently executed, the job "Job2" is input in the image processing apparatus and the job setting of the job "Job2" is registered as the registered job setting.

In FIG. 7A, the display window is shown in case that the scan operation of the job "Job1" is in progress. In the window shown in FIG. 7A, the message indicating that the scan operation for the original is in progress is displayed in the message box 30. Further, in the window shown in FIG. 7A, the job setting registration button 36 for registering the job setting of the job "Job1" as the registered job setting is displayed.

Figure 7F:
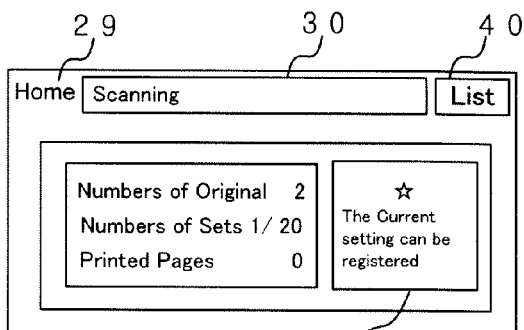
Figure 7B:
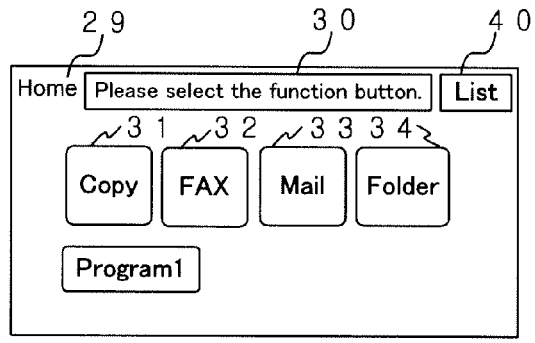
Figure 7E:
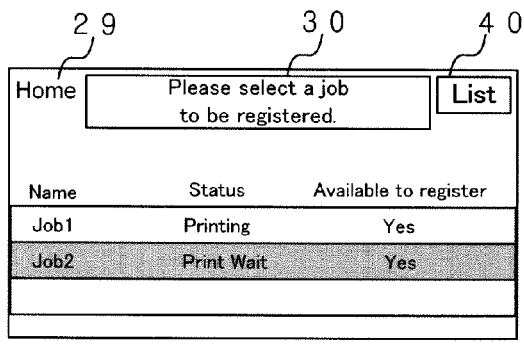

Then, in case that the scan operation of the job "Job1" is finished without pushing the job setting registration button 36, the home window is displayed as shown in FIG. 7B. At this time, in the job "Job1" in which the scan operation is finished, the print operation is carried out in the background. While the job "Job1" is executed in the background, the copy button 31 is pushed in order to input the job "Job2". Thereby, the window for inputting the job relating to the copy is displayed as shown in FIG. 7C.

Figure 7C:
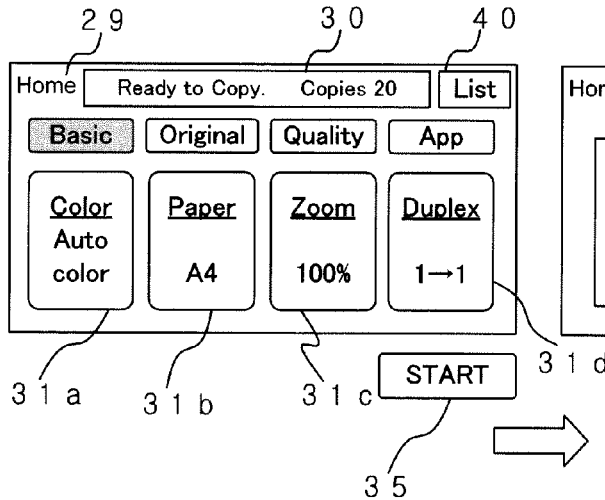

The original is set to the original feed tray and the parameters ("Copies 20") required to execute the job "Job2" are set in the window of FIG. 7C. When the start button 35 of FIG. 7C is pushed, the scan operation for the original, which is carried out by the image reading unit 13 is started and the window is displayed as shown in FIG. 7D.

Figure 7D:
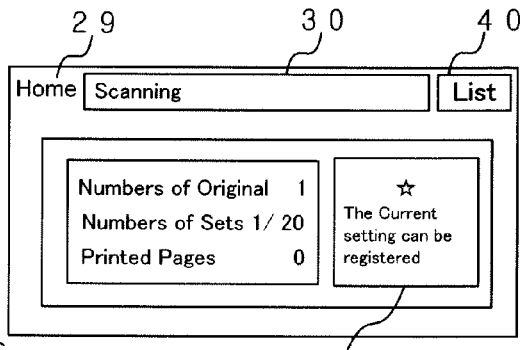

In the window shown in FIG. 7D, the message indicating that the scan operation of the job "Job2" is in progress is displayed in the message box 30. Further, in the window of FIG. 7D, the job setting registration button 36 for registering the job setting set in the window of FIG. 7C as the registered job setting is displayed.

By pushing the job setting registration button 36 displayed in FIG. 7D, the job setting of the job "Job2" is registered. However, in the following, the method for registering the job setting of the job "Job2" from the list of the selection information relating to the active jobs, which is displayed by pushing the list button 40 will be explained.

When the list button 40 displayed in the window of FIG. 7D is pushed, the selection information relating to the active jobs "Job1" and "Job2" is displayed as a list. In this list, it is indicated that the status of the job "Job1" is printing and the job setting of the job "Job1" can be registered (Yes). The status of the job "Job2" is that the scan operation is in progress. However, because the print operation of the job "Job2" cannot be carried out until the print operation of the job "Job1" is finished, in the list, it is indicated that the status of the job "Job2" is "Print wait". Further, in the list, it is indicated that the job setting of the job "Job2" can be registered (Yes).

In the message box 30 of the window of FIG. 7F, the message for prompting the user to select the selection information relating to the job displayed in the list is displayed in order to register the job setting of any active job as the registered job setting. When the job "Job2" is selected via the window of FIG. 7E, the display window shown in FIG. 7F is displayed.

In FIG. 7F, like FIG. 7D, the job setting registration button 36 for registering the job setting of the job "Job2" as the registered job setting is displayed. When this job setting registration button 36 is pushed, the window for setting the registered name and the icon of the job setting of the job "Job2" is displayed (See FIG. 3D). After the registered name and the icon of the job setting of the job "Job2" are set, the job setting of the job "Job2" is registered as the registered job setting.

In the method for registering the job setting of the job "Job1" which is currently executed in the background, similarly, when the job "Job1" is selected from the above list, the job setting registration button 36 for registering the job setting of the job "Job1" as the registered job setting is displayed. Then, by pushing this job setting registration button 36 and setting the registered name and the icon of the job setting of the job "Job1", the job setting of the job "job1" is registered. Thereby, it is possible to register the job setting of the job "Job1" which is currently executed in the background, as the registered job setting.

FIG. 8 is an example of the window showing the list of the selection information relating to the jobs in case that the job "Job2" and the job "Job3" are currently executed.

With reference to FIG. 8, the job setting registration operation will be explained in case that after the scan operation of the job "Job2" is finished without pushing the job setting registration button 36 for registering the job setting of the job "Job2" as the registered job setting, when the print operation of the job "Job2" is in progress, the job "Job3" is input from the external PC to the image processing apparatus 1.

When the job "Job3" is input to the image processing apparatus 1 while the print operation of the job "Job2" is in progress, the document data is transmitted from the PC to the image processing apparatus 1. Until the print operation of the job "Job2" is finished, the status of the job "Job3" is "Print wait". However, because the job setting of the job "Job3" is prohibited from being registered as the registered job setting, the job setting registration button 36 for registering the job setting of the job "Job3" like FIG. 7D is not displayed.

When the list button 40 is pushed after the job "Job3" is input, the selection information relating to the job "Job2" and the job "Job3" which are currently executed is displayed as the list, as shown in FIG. 8. In the list, it is indicated that the status of the job "Job2" is "Printing" and the job setting of the job "Job2" can be registered (Yes). Further, in this list, it is indicated that the status of the job "Job3" is "Printing wait" and the job setting of the job "Job3" cannot be registered as the registered job setting (No). Because the job setting of the job "Job3" is prohibited from being registered as the registered job setting, even though the job "Job3" is selected from the list, the job setting registration button 36 as shown in FIG. 7F is not displayed. Therefore, the job setting which is prohibited from being registered as the registered job setting like the job setting of the job "Job3" cannot be registered.

FIG. 9 is an example of the display window showing the list of the selection information relating to the jobs in case that the job "Job3" and the job "Job4" are currently executed.

With reference to FIG. 9, the job setting registration operation will be explained in case that when the print operation of the job "Job3" is in progress, the facsimile transmission operation of the job "Job4" is carried out.

The job "Job3" is a job relating to the print of the document data transmitted from the external PC and is not a job associated with the scan operation. Therefore, when the scan operation of the job "Job2" is finished, the job "Job 4" which is associated with the scan operation can be input. The original is set to the original feed tray and the parameters required to execute the job "Job4" are set. When the start button 35 displayed in the window is pushed, the scan operation of the job "Job4" is started. At this time, as shown in FIG. 7D, the job setting registration button 36 for registering the job setting of the job "Job4" is displayed in the window.

In case that the job "Job3" and the job "Job4" are currently executed, when the list button 40 is pushed without pushing the job setting registration button 36, the selection information relating to the job "Job3" and the job "Job4" which are currently executed, is displayed as the list, as shown in FIG. 9. In this list, it is indicated that the status of the job "Job3" is "Printing" and the job setting of the job "Job3" cannot be registered (No). Further, it is indicated that the status of the job "Job4" is "Fax Transmitting" and the job setting of the job "Job4" can be registered (Yes).

In the message box 30 in the window of FIG. 9, the message for prompting the user to select the selection information relating to the jobs displayed in the list is displayed in order to register the job setting of any one of the active jobs as the registered job setting. When the job "Job4" is selected via the window of FIG. 9, the job setting registration button 36 for registering the job setting of the job "Job4" as the registered job setting is displayed like FIG. 7F.

When the job setting registration button 36 is pushed, the window for setting the registered name and the icon of the job setting of the job "Job4" is displayed (See FIG. 3D). After the registered name and the icon of the job setting of the job "Job4" are set, the job setting of the job "Job4" is registered as the registered job setting.

Figure 10:
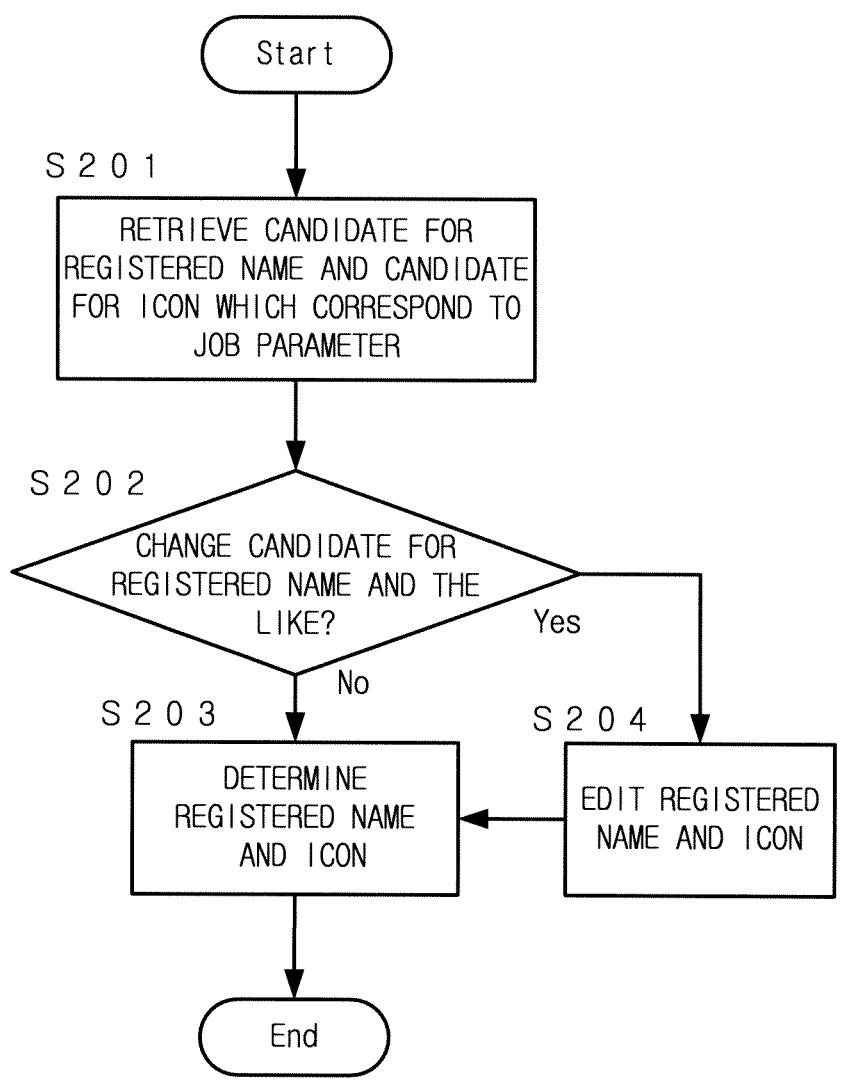
FIG. 10 is a flowchart relating to the setting operation for the registered name and the icon of the job setting to be registered as the registered job setting.

FIG. 10 is a flowchart relating to the setting operation for the registered name and the icon of the job setting to be registered as the registered job setting.

By pushing the job setting registration button 36 corresponding to the job setting of the job in which the scan operation is in progress, or after the job having the job setting to be registered is selected from the list of the selection information relating to the active job, by pushing the job setting registration button 36 corresponding to the job setting of the selected job, the job setting to be registered is determined. Then, the following setting operation for the registered name and the icon of the job setting is carried out.

When the job setting to be registered as the registered job setting is determined, the CPU 10 retrieves the candidate for the registered name and the candidate for the icon, which correspond to the parameters of the job setting, from the database relating to the registered name and the icon for the job setting, which is stored in the ROM 11. The retrieved candidate for the registered name and the retrieved candidate for the icon are displayed in the display unit 20a of the operation display unit 20 (Step S201).

The retrieved candidate for the registered name and the retrieved candidate for the icon include the registered name and the icon which instantly remind the user of the parameters of the job settings. For example, in case of the job setting in which "2In1" is set as the parameter, the registered name including the term "2In1" and the icon which easily reminds the user of 2In1 print may be retrieved from the above database as the candidates.

When the retrieved candidate for the registered name and the retrieved candidate for the icon are displayed in the display unit 20a, the indication for prompting the user to confirm whether the displayed candidate for the registered name and the displayed candidate for the icon are changed to another candidate for the registered name and another candidate for the icon, is displayed in the display unit 20a. At this time, the touch sensor unit 20b receives the changing instruction for changing the candidate for the registered name and the candidate for the icon (Step S202).

When the CPU 10 judges that the touch sensor unit 20b receives the instruction in which the retrieved candidate for the registered name and the retrieved candidate for the icon are not changed (Step S202; No), the registered name and the icon of the job setting to be registered are determined (Step S203). By storing the job setting in the nonvolatile memory 16 with the determined registered name and the determined icon, the job setting is registered as the registered job setting. The setting operation for the registered name and the icon of the job setting is ended.

When the CPU 10 judges that the touch sensor unit 20b receives the instruction in which the retrieved candidate for the registered name and the retrieved candidate for the icon are changed (Step S202; Yes), the edit of the registered name and the icon is carried out (Step S204). In the edit of the registered name and the like, for example, the CPU 10 retrieves a plurality of other candidates for the registered name and other candidates for the icon from the database relating to the registered name and the icon and the user may select one registered name and one icon from the retrieved candidates for the registered name and the like to carry out the edit of the registered name and the like. Alternatively, in the edit of the registered name, the user may input the registered name from scratch by using the touch sensor unit 20b to carry out the edit of the registered name.

When the CPU 10 determines the registered name and the like by carrying out the edit of the registered name and the icon (Step S203), the job setting to be registered is stored in the nonvolatile memory 16 with the determined registered name and the determined icon. Thereby, the job setting is registered as the registered job setting and the setting operation for the registered name and the icon of the job setting is ended.

Figures 11A, 11B:
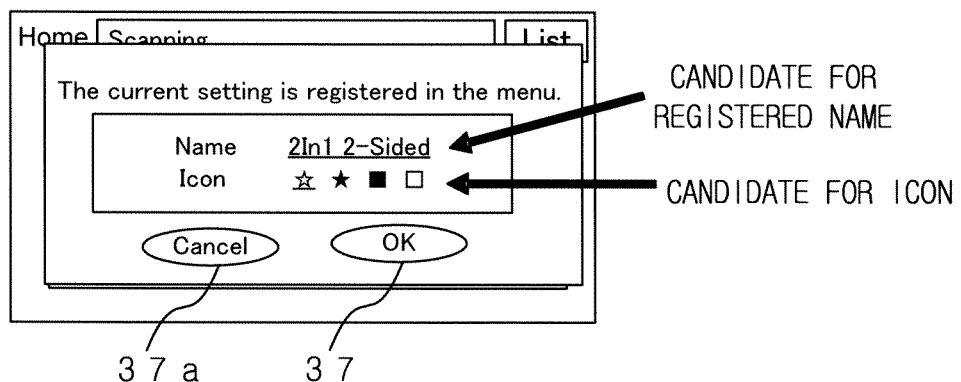
FIG. 11A is an example of the window for setting the registered name and the icon of the job setting to be registered.
FIG. 11B is a table showing each parameter used in the job setting and each candidate for the registered name and the icon which correspond to each parameter.

FIG. 11A is an example of the window for setting the registered name and the icon of the job setting to be registered. FIG. 11B is a table showing each parameter used in the job setting and each candidate for the registered name and the icon which correspond to each parameter.

In the window shown in FIG. 11A, the candidate for the registered name and the candidate for the icon of the job setting to be registered are displayed. If the displayed candidate for the registered name and the displayed candidate for the icon are not changed, the user pushes the OK button 37 to determine the registered name and the icon of the job setting. On the other hand, if the candidate for the registered name and the candidate for the icon are changed, the user pushes the cancel button 37a to carryout the edit of the registered name and the icon.

According to FIG. 11B, for example, in case that "2In1" is set as the parameter, as the candidate for the registered name of the job setting having this parameter, "User1_Pro1_2In1" is generated by incorporating the parameter name "2In1", the user name "User1" and the program name "Pro1". Further, with respect to the candidate for the icon, the icon shown in FIG. 11B is retrieved as the candidate for the icon which reminds the user of the 2In1 print. Similarly, for example, in case that the parameter for carrying out the punch and staple is set, as the candidate for the registered name of the job setting having this parameter, "User2_Pro4_Punch Staple" is generated by incorporating the parameter name "Punch Staple", the user name "User2" and the program name "Pro4". Further, with respect to the candidate for the icon, the icon shown in FIG. 11B is retrieved as the candidate for the icon which reminds the user of the punch and staple.

Figure 12:
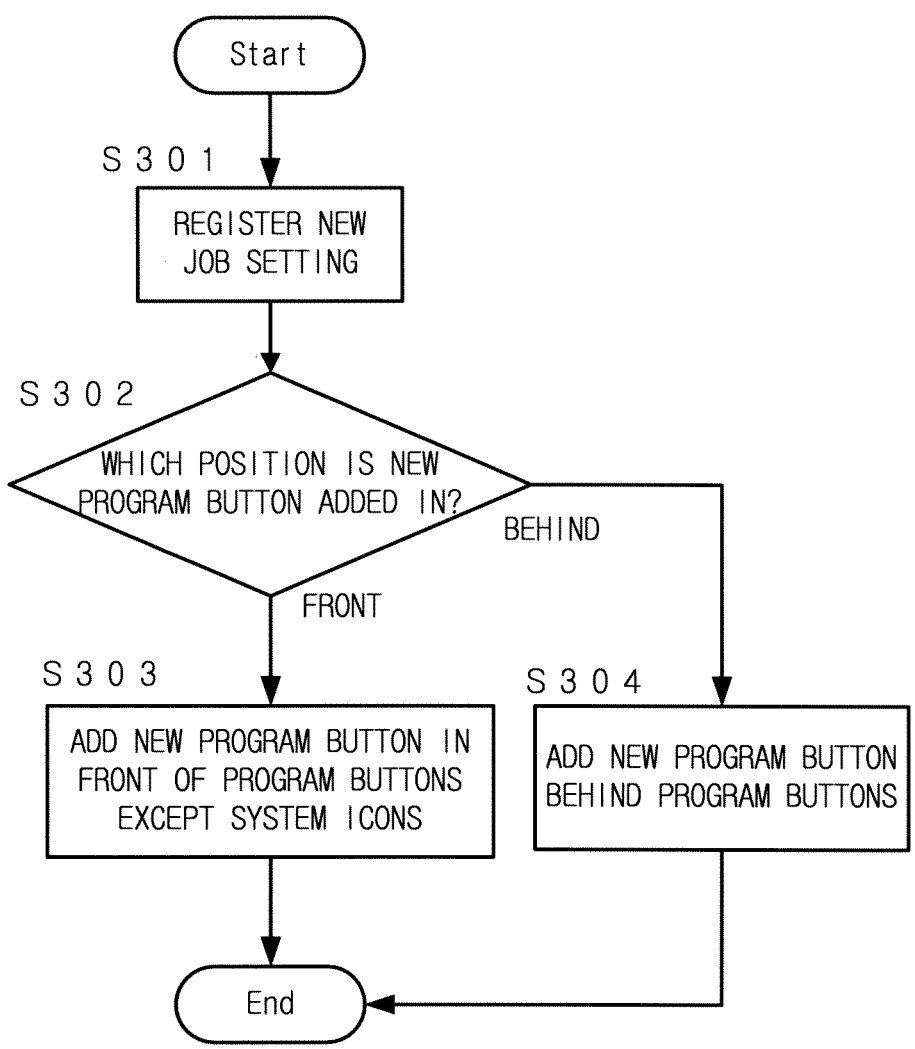
FIG. 12 is a flowchart relating to the program button display position setting for setting the display position of the program button for retrieving and resetting the registered job setting.

FIG. 12 is a flowchart relating to the program button display position setting for setting the display position of the program button 39 for retrieving and resetting the registered job setting.

When the job setting is newly registered (Step S301), the program button 39 for retrieving and resetting the new registered job setting (hereinafter, referred to as "new program button 39") is displayed on the position which is previously set in the system setting mode of the image processing apparatus 1.

In the above system setting mode, it is determined whether the new program button 39 is added in the position which is close behind a plurality of function buttons, such as the copy button 31, and in front of one or more program buttons for resetting the job setting which has been already registered, or whether the new program button 39 is added in the position which is behind the above one or more program buttons.

In case that it is determined that the new program button 39 is added in the position which is close behind a plurality of function buttons and in front of the above one or more program buttons (Step S302; front), this new program button 39 is added in the position which is close behind a plurality of function buttons and in front of the above one or more program buttons (Step S303). Then, the program button display position setting for the new program button 39 is ended.

The reason why the new program button 39 is added close behind a plurality of function buttons is as follows. Because the function buttons are ones for selecting the function to be used from among various functions of the image processing apparatus 1, it is not preferable that the display position of the function button is changed by adding the new program button 39. Further, the function buttons are different from the program buttons 39 for retrieving and resetting the registered job setting in which the detail setting for the operation (copy, facsimile communication and the like) based on each function of the image processing apparatus 1 is registered as the job setting. Therefore, it is preferable to display the function buttons so as to be apart from the program buttons.

In case that it is determined that the new program button 39 is added in the position which is behind the above one or more program buttons for resetting the job setting which has been already registered (Step S302; behind), the new program button 39 is added in the position which is behind the above one or more program buttons (Step S304). Then, the program button display position setting for the new program button 39 is ended.

Figure 13A:
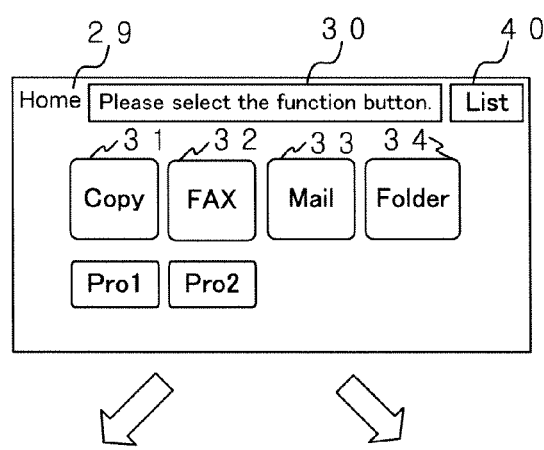
FIG. 13A is an explanatory view showing the display window displayed in the operation display unit before a new program button is added.
Figure 13B:
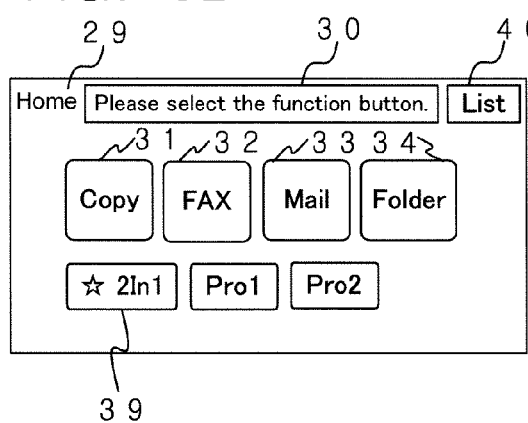
FIGS. 13B and 13C are explanatory views showing the display windows displayed in the operation display unit after the new program button is added.
Figure 13C:
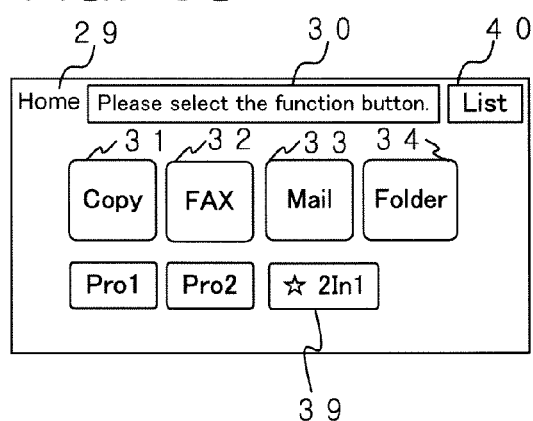

FIG. 13A is an explanatory view showing the display window displayed in the display unit 20a before the new program button 39 is added, and FIGS. 13B and 13C are explanatory views showing the display window displayed in the display unit 20a after the new program button 39 is added.

FIG. 13A shows the home window which is displayed before the new program button 39 is added. In the example shown in FIG. 13A, two registered job settings have been already stored in the nonvolatile memory 16 and two program buttons for resetting these job settings are displayed.

When the job setting of the job is newly registered as the registered job setting in the state that the two registered job settings are stored in the nonvolatile memory 16, the new program button 39 is added in the position which is previously set in the system setting mode of the image processing apparatus 1. In case that in the above system setting mode, it is determined that the new program button 39 is added in the position which is close behind a plurality of function buttons and in front of the existing program buttons, the new program button 39 is added in the position in front of these two program buttons as shown in FIG. 13B. On the other hand, in case that in the above system setting mode, it is determined that the new program buttons 39 is added in the position which is behind the existing program buttons, the new program button 39 is added in the position behind these two program buttons as shown in FIG. 13C.

With respect to the program button display position setting for setting the display position of the new program button 39 in the system setting mode of the image processing apparatus 1, it is possible to suitably change the above setting in the system setting mode. In this example, the display position of the new program button 39 is previously set in the above system setting mode. However, every when the job setting of the job is newly registered as the registered job setting, the image processing apparatus 1 may receive the instruction relating to the display position of the new program button 39 from the user.

Next, the program button deleting process for deleting the program button 39 displayed in the display unit 20a will be explained.

Figure 14:
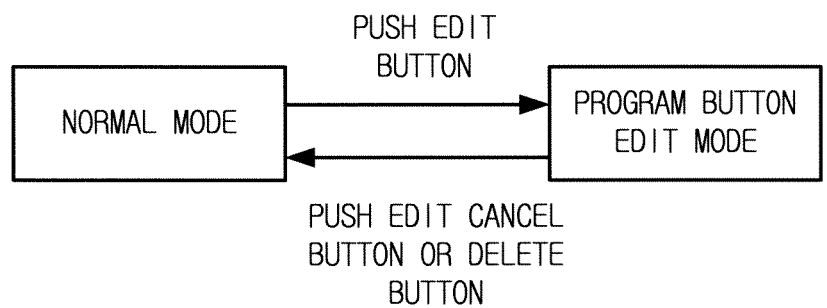
FIG. 14 is an explanatory view showing the change between the normal mode and the program button edit mode.

FIG. 14 is an explanatory view showing the change between the normal mode and the program button edit mode. The normal mode is a mode for carrying out the operation (copy of an original, facsimile communication for transmitting image data, and the like) based on various functions (copy function, facsimile function and the like) of the image processing apparatus 1. Further, in this normal mode, as described above, the job setting registration operation for registering the job setting of the active job as the registered job setting is carried out. The program button edit mode is a mode for deleting the program button 39 corresponding to the registered job setting. Further, by deleting the program button 39, the registered job setting corresponding to the deleted program button 39 is deleted from the nonvolatile memory 16.

In case that the mode of the image processing apparatus 1 is the normal mode, when the edit button 60 (See FIG. 16A) displayed in the home window is pushed by the user, the mode of the image processing apparatus 1 changes to the program button edit mode.

In case that the mode of the image processing apparatus 1 is the program button edit mode, when the edit cancel button 62 (See FIG. 16B) displayed in the home window is pushed, or when the delete button 63 (See FIG. 16B) is pushed in the state that the program button 39 to be deleted is selected, the mode of the image processing apparatus 1 changes to the normal mode.

Figure 15:
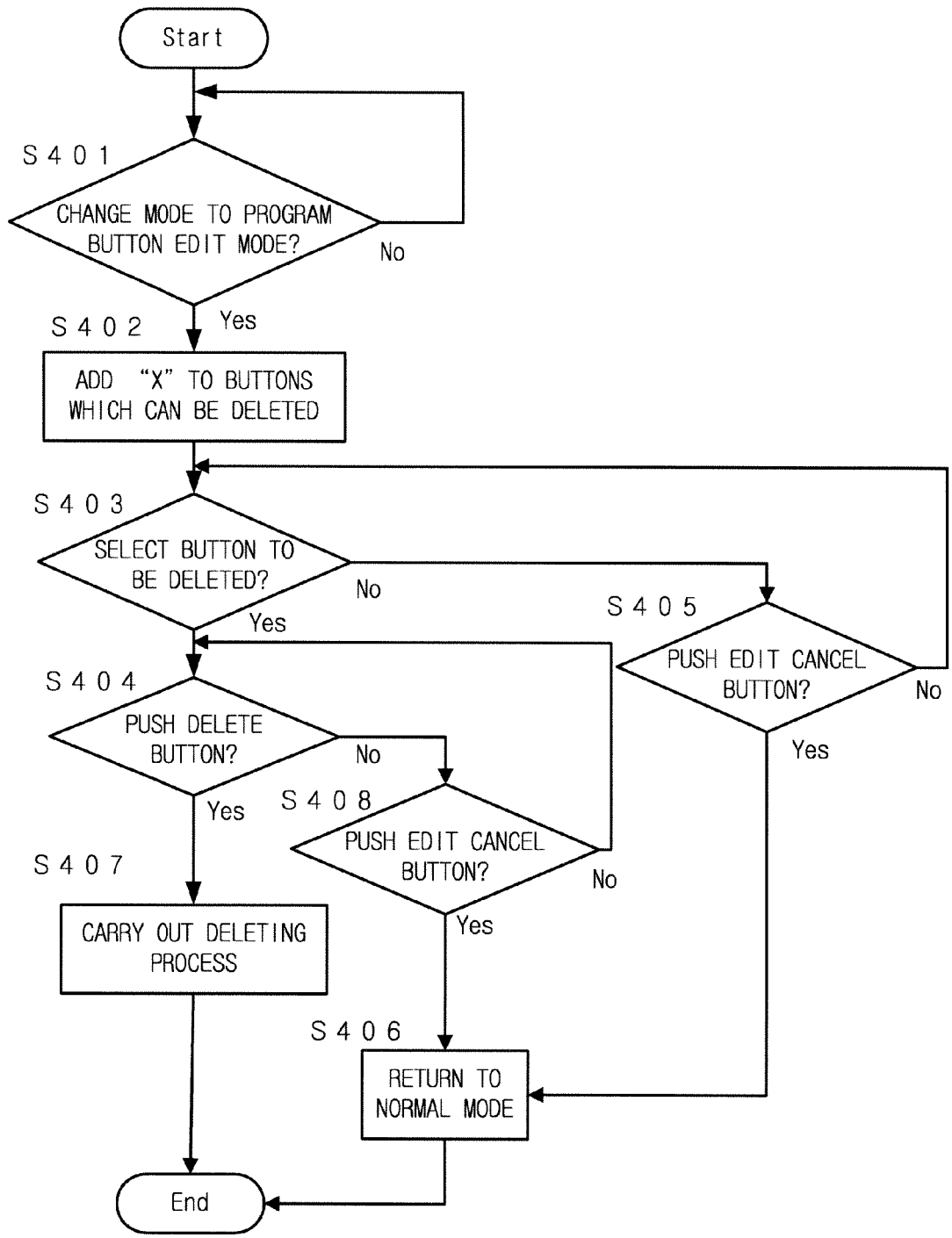
FIG. 15 is a flowchart relating to the program button deleting process for deleting the program button for retrieving and resetting the registered job setting.

FIG. 15 is a flowchart relating to the program button deleting process for deleting the program button 39 for retrieving and resetting the registered job setting. When the program button 39 is deleted by the program button deleting process, the registered job setting corresponding to the program button 39 is also deleted from the nonvolatile memory 16.

In case that the mode of the image processing apparatus 1 is the normal mode, the CPU 10 monitors whether the mode changes to the program button edit mode for deleting one or more program buttons 39 displayed in the display unit 20a (Step S401; No).

When the touch sensor unit 20b detects the push of the edit button 60 (See FIG. 16A) displayed in the home window and the CPU 10 judges that the mode changes to the program button edit mode (Step S401; Yes), the mark "X" 61 (See FIG. 16B and the like) is added to the program button 39 which can be deleted, as additional information (Step S402). Thereby, it is indicated that the program button 39 to which the mark "X" 61 is added can be deleted.

The CPU 10 judges whether the touch sensor unit 20b receives the instruction for selecting one or more program buttons 39 from among the program buttons 39 to which the mark "X" 61 is added (Step S403). When the CPU 10 judges that the touch sensor unit 20b receives the instruction for selecting the above one or more program buttons 39 (Step S403; Yes), the process proceeds to Step S404.

When the CPU 10 judges that the touch sensor unit 20b does not receive the instruction for selecting one or more program buttons 39 from among the program buttons 39 to which the mark "X" 61 is added (Step S403; No), the CPU 10 judges whether the touch sensor unit 20b detects the push of the edit cancel button 62 (See FIG. 16B) displayed in the display unit 20a (Step S405).

When the CPU 10 judges that the touch sensor unit 20b detects the push of the edit cancel button 62 (Step S405; Yes), the mode changes from the program button edit mode to the normal mode for carrying out the operation (copy, facsimile communication and the like) based on various functions of the image processing apparatus 1 (Step S406). Then, the program button deleting process is ended.

When the CPU 10 judges that the touch sensor unit 20b does not detect the push of the edit cancel button 62 (Step S405; No), the process returns to Step S403. The CPU 10 monitors the selection of the program button 39 which can be deleted or the push of the edit cancel button 62.

On the other hand, when the CPU 10 judges that the touch sensor unit 20b receives the instruction for selecting one or more program buttons 39 from among the program buttons 39 to which the mark "X" 61 is added (Step S403; Yes), the CPU 10 judges whether the touch sensor unit 20b detects the push of the delete button 63 (See FIG. 16B) for deleting the selected program buttons 39 (Step S404).

When the CPU 10 judges that the touch sensor unit 20b detects the push of the delete button 63 (Step S404; Yes), the deleting process for deleting the selected program button 39 is carried out (Step S407). Thereby, the selected program button 39 is deleted from the home window. Then, the program button deleting process is ended.

When the CPU 10 judges that touch sensor unit 20b does not detect the push of the delete button 63 (Step S404; No), the CPU 10 judges whether the touch sensor unit 20b detects the push of the edit cancel button 62 (Step S408).

When the CPU 10 judges that the touch sensor unit 20b detects the push of the edit cancel button 62 (Step S408; Yes), the mode changes from the program button edit mode to the normal mode (Step S406). Then, the program button deleting process is ended.

When the CPU 10 judges that the touch sensor unit 20b does not detect the push of the edit cancel button 62 (Step S408; No), the process returns to Step S404. Then, the CPU 10 monitors the push of the delete button 63 or the push of the edit cancel button 62.

FIGS. 16A to 16E are explanatory views showing the change in the display window displayed in the display unit 20a until the program button 39 is deleted in the program button edit mode.

Figure 16A:
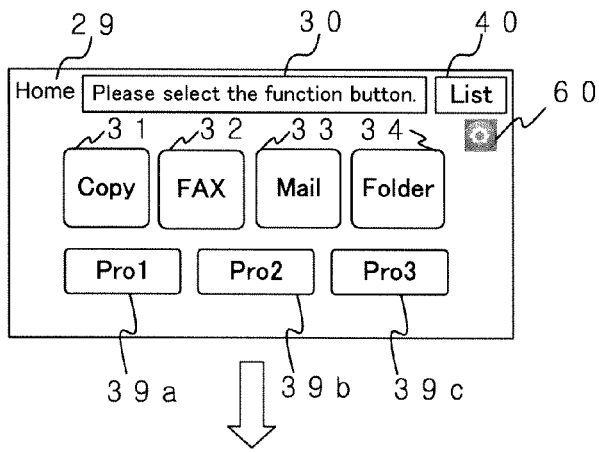
FIGS. 16A to 16E are explanatory views showing the change in the display window displayed in the operation display unit until the program button is deleted in the program button edit mode.

In FIG. 16A, the display window (home window) for selecting one function used for executing the job to be input from among various functions (copy function, facsimile function and the like) of the image processing apparatus 1 is shown. In this display window, the edit button 60 for changing the mode of the image processing apparatus 1 to the program button edit mode is displayed.

Figure 16B:
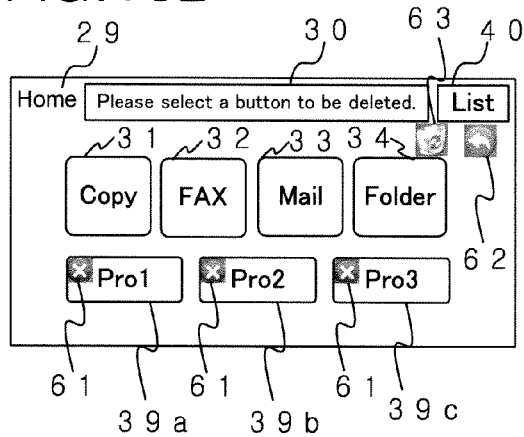

In FIG. 16B, the display window displayed after the edit button 60 is pushed is shown. When the edit button 60 is pushed, the mode of the image processing apparatus 1 changes to the above program button edit mode. The mark "X" 61 is added to each of the program buttons 39a to 39c which can be deleted, as the additional information. Thereby, the user can recognize that the program buttons 39a to 39c to which the mark "X" 61 is added can be deleted. On the other hand, the mark "X" 61 is not added to the copy button 31, the facsimile button 32, the mail button 33 and the folder button 34. The function buttons, such as the copy button 31 and the like, function as the system icons. Therefore, in the above program button edit mode, these function buttons cannot be deleted. Further, in the message box 30, the massage for prompting the user to select the program button to be deleted from among the program buttons 39a to 39c which can be deleted, is displayed.

Figure 16E:
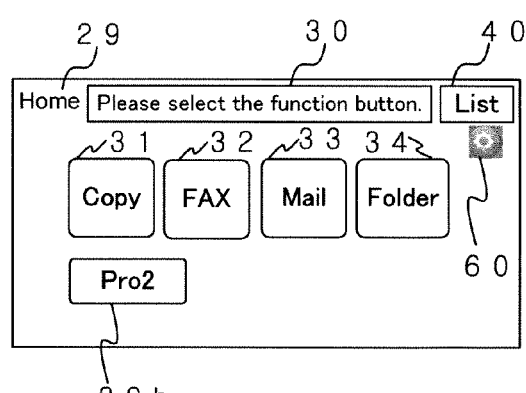
Figure 16C:
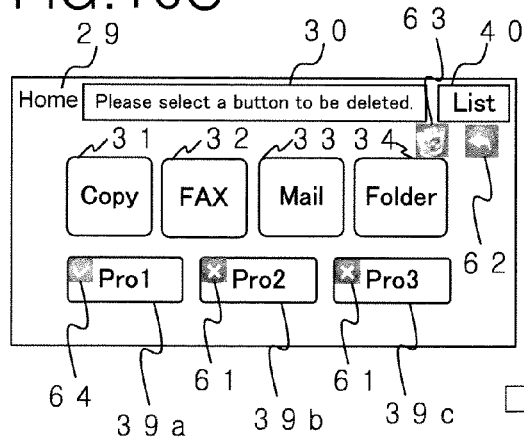

When the first program button 39a (registered name: "Pro1") is selected by pushing the first program button 39a as the button to be deleted from among the program buttons 39a to 39c which can be deleted, the mark "X" 61 of the first program button 39a is changed to the check mark 64 as shown in FIG. 16C. The first program button 39a to which the check mark 64 is added is deleted by pushing the delete button 63.

Figure 16D:
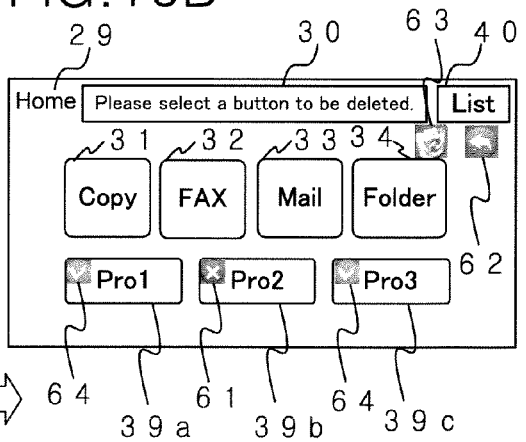

In the window of FIG. 16C, when the third program button 39c (registered name: "Pro3") is pushed, the mark "X" 61 of the third program button 39c is changed to the check mark 64 as shown in FIG. 16D. In the window of FIG. 16D, when the delete button 63 is pushed, the first program button 39a and the third program button 39c are deleted and the second program button 39b remains as shown in FIG. 16E.

The job setting of the job "Pro1" corresponding to the deleted first program button 39a and the job setting of the job "Pro3" corresponding to the deleted third program button 39c are deleted from the nonvolatile memory 16.

In the above program button deleting process, because all of the program buttons 39a to 39c can be deleted, the mark "X" 61 is added to all of the program buttons 39a to 39c. However, in case that there is a program button which the user wants not to be deleted among the program buttons 39a to 39c, the program button may be protected by a known method so as not delete the program button. In this case, even though the edit button 60 is pushed, the mark "X" 61 is not added to the protected program button. Thereby, it can be prevented that the protected program button is accidentally deleted.

Figure 17:
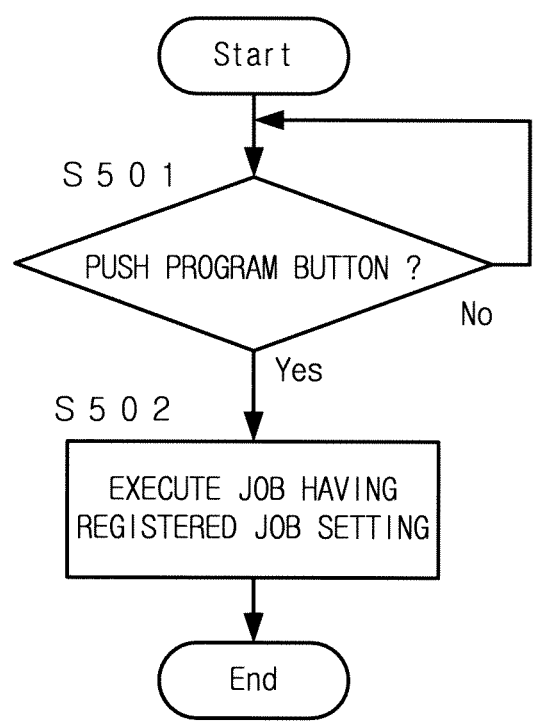
FIG. 17 is a flowchart relating to the job execution operation for retrieving and resetting the registered job setting by pushing the program button corresponding to the registered job setting to execute the job.

FIG. 17 is a flowchart relating to the job execution operation for retrieving and resetting the registered job setting by pushing the program button corresponding to the registered job setting to execute the job.

The CPU 10 monitors whether the touch sensor unit 20b detects the push of the program button 39 displayed in the home window (Step S501; No).

When the CPU 10 judges that the touch sensor unit 20b detects the push of the program button 39 (Step S501; Yes), the registered job setting corresponding to the pushed program button 39 is retrieved. Then, the CPU 10 automatically sets the registered job setting to the image processing apparatus 1. When the touch sensor unit 20b detects the push of the start button 35, the CPU 10 executes the job in accordance with the set job setting (Step S502). The job execution operation is ended.

Figure 18A:
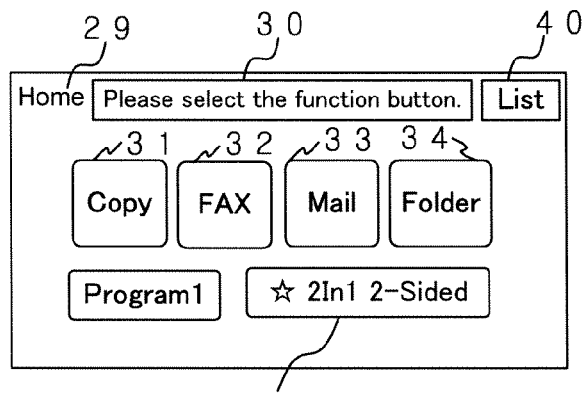
FIGS. 18A to 18C are explanatory views showing the change in the display window displayed in the operation display unit in case that the job is executed by the job execution operation.
Figure 18B:
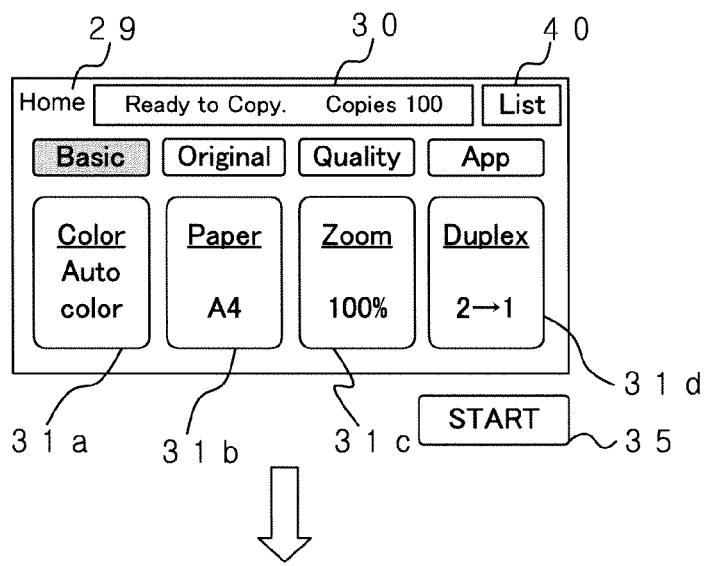
Figure 18C:
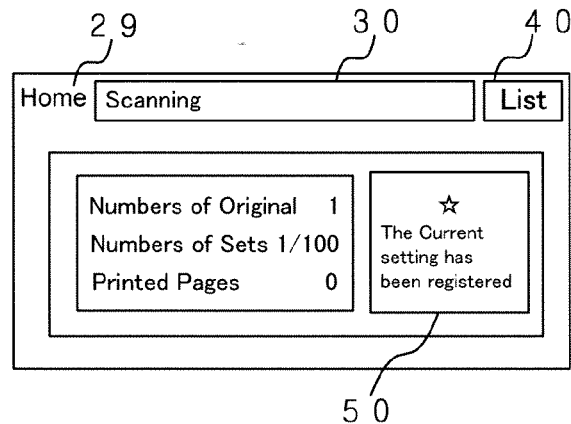

FIGS. 18A to 18C are explanatory views showing the change in the display window displayed in the display unit 20a in case that the job is executed by the job execution operation.

FIG. 18A shows the home window in which the program button 39 corresponding to the registered job setting of the job to be executed is displayed. When this program button 39 is pushed, the registered job setting corresponding to the pushed program button 39 is automatically set as shown in FIG. 18B.

When the start button 35 is pushed in the window shown in FIG. 18B, the job is executed in accordance with the job setting. Then, the window shown in FIG. 18C is displayed.

In FIG. 18C, the message indicating that the scan operation for the original is in progress is displayed in the message box 30. Further, the message indicating that the job setting of the active job has been already registered as the registered job setting, is displayed in the message box 50.

As described above, in this embodiment, the information relating to one or more jobs among a plurality of active jobs is displayed in the operation display unit 20 as the job setting registration button 36 or the list. One or more jobs are selected from the displayed information and each job setting of the selected jobs is stored in the nonvolatile memory 16. Thereby, even though the image processing apparatus 1 is a multijob compliant image processing apparatus, when a plurality of jobs are currently executed, the user can select the job from among a plurality of jobs which are currently executed and can register the job setting of the selected job.

Further, in case that the input job is a job associated with the scan operation for the original, when the scan operation is in progress, the job setting registration button 36 for registering the job setting of the above job as the registered job setting is displayed in the display unit 20a. When the user pushes the job setting registration button 36, the job setting of the above job is registered. Therefore, it is possible to register the job setting of the job in which the scan operation is in progress, as the registered job setting by the simple operation.

In case that the input job is a job associated with the scan operation for the original, the CPU 10 instructs the display unit 20a to display the information relating to the above job as a list since the scan operation is finished until the above job is finished. When the user selects the above job from this list, the job setting of the above job is registered as the registered job setting. Therefore, it is possible to register the job setting of the job in which the scan operation is finished and the following operation is carried out in the background, as the registered job setting by the simple operation.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In the embodiment, the case in which the job setting of the job associated with the scan operation is registered as the registered job setting is mainly explained as an example. However, even in case of the job setting of the job which is not associated with the scan operation, when the above job is executed in the foreground, the CPU 10 instructs the display unit 20a to display the job setting registration button 36. The job setting of the above job may be registered by pushing the job setting registration button 36. Further, when the job which is not associated with the scan operation is executed in the background, the list is displayed by pushing the list button 40. By selecting the above job which is currently executed from the list, the job setting of the above job may be registered.

In the embodiment, the job setting of the job input from an external PC is prohibited from being registered as the registered job setting. However, in case that there are job settings which are prohibited from being registered as the registered job setting except the job setting of the job input from the external PC, the setting of the image processing apparatus 1 may be optionally changed by the user so as to prohibit the above job settings from being registered.

Modified Example 1

Figure 19A:
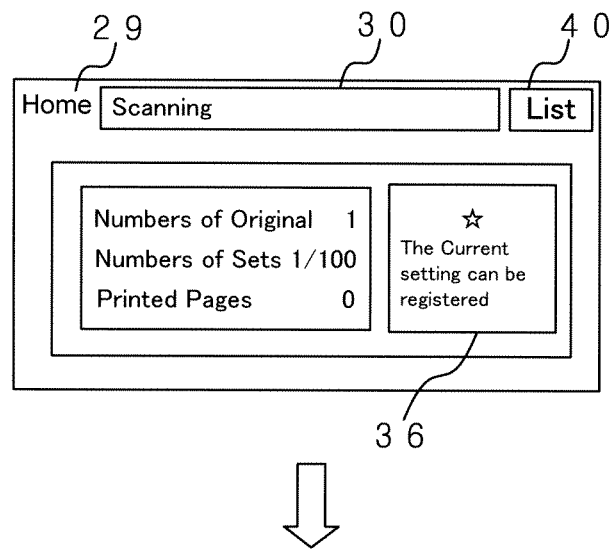
FIGS. 19A and 19B are explanatory views showing the change in the display window displayed in the operation display unit when the job "Job1" is currently executed, according to the modified example 1.
Figure 19B:
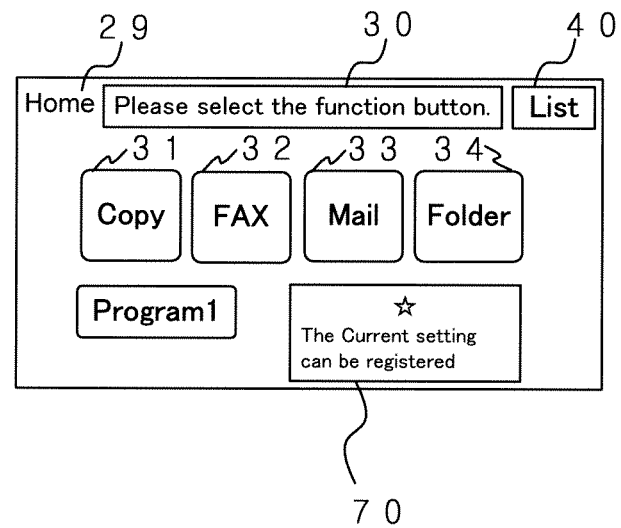

FIGS. 19A and 19B are explanatory views showing the change in the display window displayed in the operation display unit 20 when the job "Job1" is currently executed, according to the modified example 1.

In FIG. 19A, like FIG. 7A, when the scan operation of the above job "Job1" is in progress, the job setting registration button 36 for registering the job setting of the job "Job1" as the registered job setting is displayed. After the scan operation of the job "Job1" is finished without pushing the job setting registration button 36, the image processing apparatus 1 can receive a new job. In the display unit 20a, the home window is displayed.

In FIG. 19B, the message 70 for prompting the user to register the job setting of the job "Job1" which is currently executed in the background as the registered job setting, is displayed in the home window. Therefore, it is possible to avoid failing to the registration of the job setting of the job which is currently executed.

Modified Example 2

FIGS. 20A to 20D are explanatory views showing the change in the display window displayed in the operation display unit 20 in case that while the job "Job1" is currently executed, the job "Job2" is input to the image processing apparatus 1, according to the modified example 2. In the modified example 2, the job setting registration button corresponding to the job setting of each job which is currently executed in the background, is displayed in the operation display unit 20.

Figure 20A:
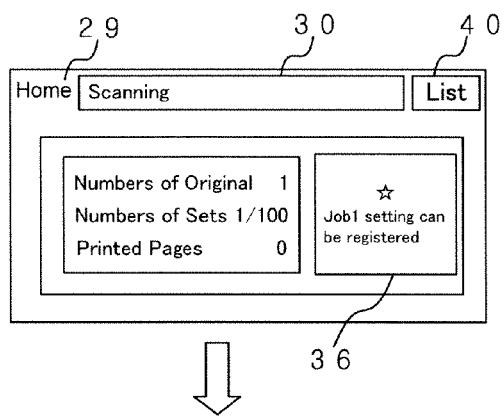
FIGS. 20A to 20D are explanatory views showing the change in the display window displayed in the operation display unit in case that while the job "Job1" is executed, the job "Job2" is input to the image processing apparatus, according to the modified example 2.

In FIG. 20A, like FIG. 7A, when the scan operation of the above job "Job1" is in progress, the job setting registration button 36 for registering the job setting of the job "Job1" as the registered job setting is displayed. After the scan operation of the job "Job1" is finished without pushing the job setting registration button 36, when the copy button 31 is pushed in the home window, the window for inputting the job "Job2" is displayed as shown in FIG. 203.

Figure 20B:
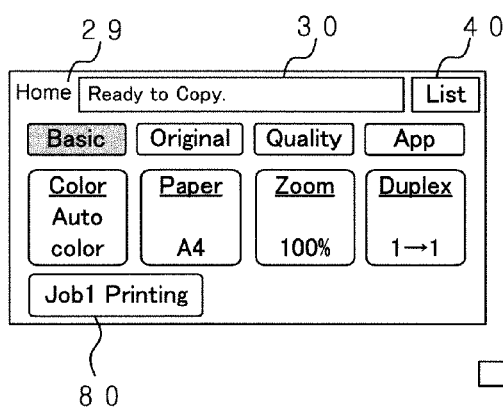

At this time, in the window of FIG. 20B, the job setting registration button 80 for registering the job setting of the job "Job1" which is currently executed in the background as the registered job setting, is displayed. By using the job setting registration button 80, it is possible to easily register the job setting of the job "Job1" which is currently executed in the background, without pushing the list button 40.

Figure 20D:
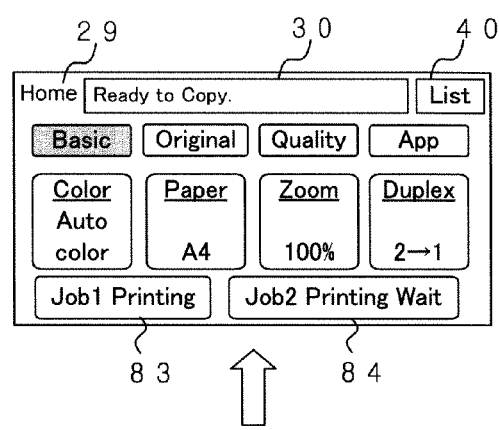
Figure 20C:
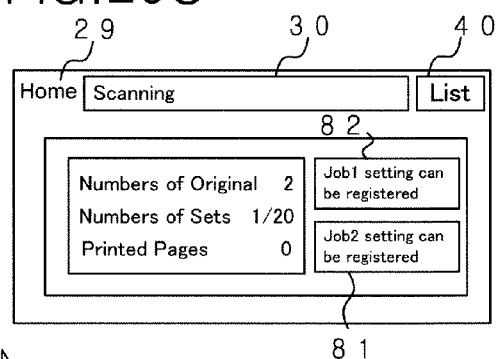

Further, when the scan operation of the job "Job2" is in progress, in the window of FIG. 20C, in addition to the job setting registration button 81 for registering the job setting of the job "Job2" as the registered job setting, the job setting registration button 82 for registering the job setting of the job "Job1" which is currently executed in the background as the registered job setting, is displayed. By using the job setting registration button 82, it is possible to easily register the job setting of the job "Job1" which is currently executed in the background, without pushing the list button 40.

After the scan operation of the job "Job2" is finished, when the copy button 31 is pushed in the home window, the window is displayed as shown in FIG. 20D.

In the window of FIG. 20D, the job setting registration button 83 for registering the job setting of the job "Job1" which is currently executed in the background as the registered job setting and the job setting registration button 84 for registering the job setting of the job "Job2" which is currently executed in the background as the registered job setting, are displayed. Thereby, it is possible to easily register each job setting of the job "Job1" and the job "Job2" which are currently executed in the background, without pushing the list button 40.

Modified Example 3

FIGS. 21A to 21D are explanatory views showing the change in the display window displayed in the operation display unit 20 when the job setting of the job "Job1" is provisionally registered, according to the modified example 3. With reference to these drawings, the operation for provisionally registering the job setting of the above job "Job1" will be explained.

Figure 21A:
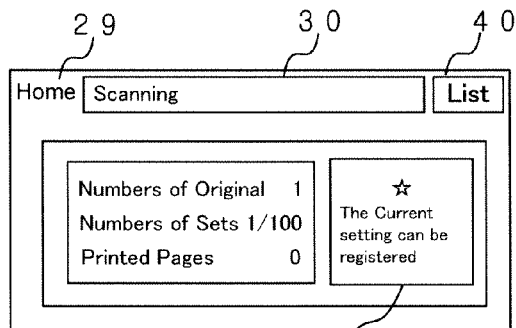
FIGS. 21A to 21D are explanatory views showing the change in the display window displayed in the operation display unit when the job setting of the job "Job1" is provisionally registered, according to the modified example 3.

In FIG. 21A, like FIG. 7A, when the scan operation of the above job "Job1" is in progress, the job setting registration button 36 for registering the job setting of the job "Job1" as the registered job setting is displayed. After the scan operation of the job "Job1" is finished without pushing the job setting registration button 36, that is, when the print operation of the job "Job1" is carried out in the background without registering the job setting of the job "Job1", the job setting of the job "Job1" is stored in the nonvolatile memory 16 as the provisional registered job setting. The home window is displayed as shown in FIG. 21B.

Figure 21B:
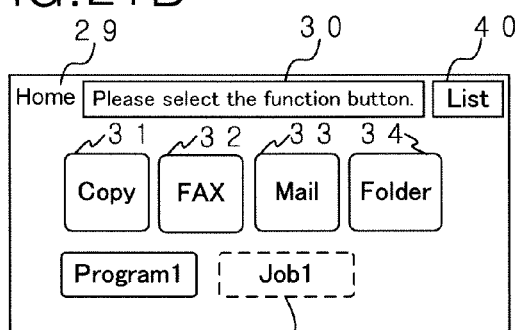

In the home window of FIG. 21B, the program button 90 corresponding to the job "Job1" is displayed. This program button 90 is displayed with a dotted line in order to distinguish the program button 90 from the program button 39 corresponding to the registered job setting which is definitively registered.

Figure 21C:
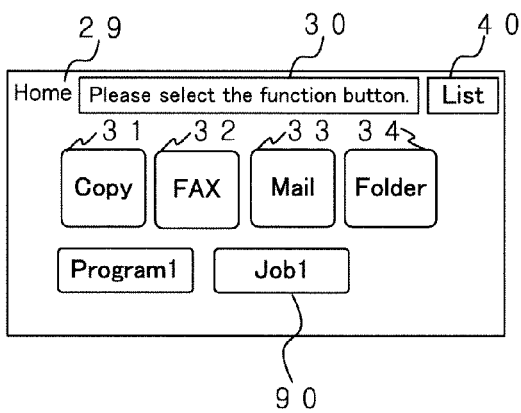

In case that the job setting of the job "Job1" is retrieved from the nonvolatile memory 16 by pushing the program button 90 and the job "Job1" is executed before the predetermined time period elapses since the job setting of the job "Job1" is stored as the provisional registered job setting, the provisional registered job setting of the job "Job1" is definitively registered as the registered job setting. At this time, in the home window, as shown in FIG. 21C, the program button 90 is displayed with a solid line.

Figure 21D:
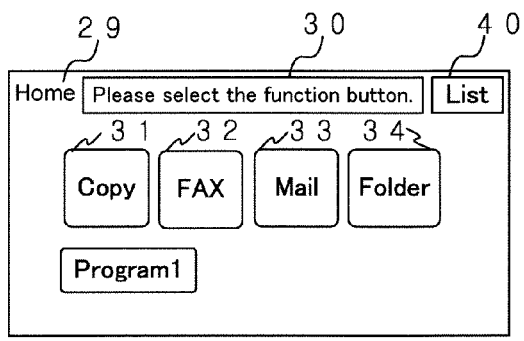

On the other hand, in case that the job "Job1" is not executed by pushing the program button 90 before the predetermined time period elapses since the job setting of the job "Job1" is stored as the provisional registered job setting, the job setting of the job "Job1", which is provisionally registered is automatically deleted from the nonvolatile memory 16. At this time, in the home window, as shown in FIG. 21D, the program button 90 is deleted.

In this example, preferably, the predetermined time period is reset by retrieving the provisional registered job setting again within the predetermined time period, for example, one week. In case that it is assumed that the provisional registered job setting is unlikely used again in the future if the job having the provisional registered job setting is not executed within a certain period of time, the predetermined time period is preferably set to the above certain period of time. The predetermined time period may be optionally changed by the user.

In the multijob compliant image processing apparatus 1, because a plurality of jobs are executed in parallel, the time period for which one job is executed in the foreground is generally shorter than the time period for which one job is executed by a single job compliant image processing apparatus. Therefore, the job setting registration button 36 displayed while the job is executed in the foreground usually disappears from the display window shortly.

In the modified example 3, in order to solve the problem in which the job setting cannot be registered by the simple operation, that is, by only pushing the job setting registration button 36 because the job setting registration button 36 disappears, when the job is executed in the background without pushing the job setting registration button 36, the job setting is stored as the provisional registered job setting in the nonvolatile memory 16. At this time, the program button 90 corresponding to the above job setting is displayed in the home window.

When the job setting of the job is retrieved from the nonvolatile memory 16 by pushing the program button 90 and the job is executed before the predetermined time period elapses since the job setting is provisionally registered, the provisional registered job setting is definitively registered as the registered job setting. Therefore, by the simple operation, the job setting can be registered.

On the other hand, in case that the job is not executed by pushing the program button 90 before the predetermined time period elapses since the job setting is provisionally registered, the provisional registered job setting is deleted from the nonvolatile memory 16. The provisional registered job setting which is not used within the above predetermined time period is unlikely used in the future. In the modified example 3, because the provisional registered job setting is automatically deleted after the predetermined time period elapses, it is possible to omit the deletion operation for deleting the provisional registered job setting by the user.

Further, in the modified example 3, the predetermined time period is a constant time period, such as one week. However, the predetermined time period is not limited to the constant time period. For example, the predetermined time period is determined in accordance with the number of times of the use of the image processing apparatus 1. Specifically, in case that the job having the provisional registered job setting is not executed while the user uses the image processing apparatus the curtain number of time, the provisional registered job setting may be automatically deleted.

Further, even though the predetermined time period does not elapse, in case that the deletion operation for the provisional registered job setting is carried out, the provisional registered job setting can be deleted. Even though the job having the provisional registered job setting is not executed during the predetermined time period, in case that the operation for definitively registering the provisional registered job setting is carried out, this provisional registered job setting can be definitively registered.

In the above modified examples 1 to 3, the two features disclosed in these examples may be incorporated into the image processing apparatus 1 disclosed in the embodiment.

One of the objects of the above embodiment and the modified examples is to provide a job setting registration device, an image processing apparatus, a tangible computer-readable recording medium and a method for registering a job setting, for receiving the selection instruction for selecting the job setting to be registered from among job settings of a plurality of jobs when a plurality of jobs are currently executed, and for registering the selected job setting.

In the above embodiment and the like, the job setting selection receiving unit receives the selection instruction for selecting a job setting to be registered as the registered job setting from among job settings of a plurality of jobs which are currently executed. The registered job setting storing unit stores the selected job setting as the registered job setting in accordance with the selection instruction. Thereby, the user can select the job setting to be registered from among the job settings of a plurality of jobs which are currently executed and can register the selected job setting.

In the above embodiment and the like, the selection information includes a provisional name of the job, the job setting itself, the status of the active job, and the like, and means the information for specifying the job setting in order to select the job setting.

In the above embodiment and the like, in case that the active job is a job associated with the scan operation for the original, the registration button for registering the job setting of the above job as the registered job setting is displayed in the display unit when the scan operation is in progress. By pushing the registration button, the job setting is registered. Thereby, it is possible to register the job setting of the job in which the scan operation is in progress by the simple operation.

In the embodiment and the like, in case that the active job is a job associated with the scan operation, the selection information relating to the above job is displayed in the display unit since the scan operation is finished until the job is finished. By selecting the job setting from the displayed selection information, the job setting of the job is registered as the registered job setting. Thereby, it is possible to register the job setting of the job in which the scan operation is finished and the following operation is carried out in the background, as the registered job setting.

In the embodiment and the like, even in the multijob compliant image processing apparatus, the user can omit the resetting of the job setting from scratch every when the same job is executed.

According to the job setting registration device, the image processing apparatus, the tangible computer-readable recording medium and the method for registering the job setting, when a plurality of jobs are currently executed, it is possible to receive the selection instruction for selecting the job setting to be registered from among the job settings of a plurality of jobs and to register the selected job setting.

What is claimed is:

1. A job setting registration device, comprising:
  a job setting selection receiving unit to receive a selection instruction for selecting a job setting to be registered as a registered job setting for enabling the job setting to be reset by retrieving the job setting, from among job settings of a plurality of jobs which are currently executed in parallel by a predetermined image processing apparatus; and
  a registered job setting storing unit to store the selected job setting as the registered job setting in accordance with the selection instruction received by the job setting selection receiving unit,
  wherein when the job is currently executed in a background in a state that the job setting selection receiving unit does not receive the selection instruction for selecting the job setting of the job which is currently executed, the registered job setting storing unit stores the job setting of the job as a provisional registered job setting, in case that the job having the job setting stored as the provisional registered job setting is executed by retrieving the job setting from the registered job setting storing unit before a predetermined time period elapses since the job setting is stored as the provisional registered job setting, the provisional registered job setting is stored as the registered job setting, and in case that the job having the job setting stored as the provisional registered job setting is not executed by retrieving the job setting from the registered job setting storing unit before the predetermined time period elapses since the job setting is stored as the provisional registered job setting, the provisional registered job setting is deleted from the registered job setting storing unit.

2. The job setting registration device of claim 1, further comprising:
a display unit; and
a display control unit to control the display unit so as to display selection information used for selecting the job setting when the job setting selection receiving unit receives the selection instruction.

3. The job setting registration device of claim 2, wherein a first job among the plurality of jobs is a job associated with a scan operation for optically reading an original,
the display control unit controls the display unit so as to display a registration button for registering a job setting of the first job while the scan operation is in progress, and
the job setting selection receiving unit receives the selection instruction by pushing the registration button.

4. The job setting registration device of claim 2, wherein a first job among the plurality of jobs is a job associated with a scan operation for optically reading an original,
the job setting selection receiving unit receives a display instruction for displaying the selection information relating the first job at least during a time period which elapses since the scan operation is finished until the first job is finished,
the display control unit controls the display unit so as to display the selection information relating to the first job in accordance with the display instruction, and
the processor registers the job setting of the first job in the registered job setting storing unit when the job setting selection receiving unit receives the selection instruction for selecting the job setting of the first job from the selection information relating to the first job, which is displayed by the display unit.

5. The job setting registration device of claim 2, wherein the display control unit controls the display unit so as to display an indication for prompting a user to register the job setting of the job which is currently executed as the registered job setting when the image processing apparatus can receive a new job.

6. The job setting registration device of claim 1, further comprising:
a job setting registration judging unit to judge whether the job setting is prohibited from being registered in the registered job setting storing unit as the registered job setting, and to prohibit the job setting from being registered in the registered job setting storing unit as the registered job setting when the job setting registration judging unit judges that the job setting is prohibited.

7. An image processing apparatus, comprising:
the job setting registration device of claim 1; and
a job execution unit to enable the plurality of jobs to be executed,
wherein the job execution unit executes a first job among the plurality of jobs by retrieving the registered job setting from the registered job setting storing unit and executes a second job by retrieving the registered job setting from the registered job setting storing unit.

8. The image processing apparatus of claim 7, wherein the job execution unit has two or more functions selected from among a copy function for copying an original in accordance with image data of the original, which is obtained by scanning the original, a print function for printing an image in accordance with image data transmitted from an external apparatus, and a facsimile function for transmitting the image data of the original, which is obtained by scanning the original.

9. The job setting registration device of claim 1, wherein the job setting selection receiving unit receives the selection instruction while the plurality of jobs are executed.

10. A non-transitory computer-readable recording medium storing a program, wherein the program causes an image processing apparatus to function as:
a job setting selection receiving unit to receive a selection instruction for selecting a job setting to be registered in a memory as a registered job setting, from among job settings of a plurality of jobs which are currently executed by the image processing apparatus, wherein the job setting to be registered in the memory is for a job which can be executed by the image processing apparatus; and
a processor to register the selected job setting in the memory while the plurality of jobs are executed and in accordance with the selection instruction received by the job setting selection receiving unit,
wherein when a second job is executed, the second job being different from the job having the job setting registered in the memory, the job setting registered in the memory is set to the second job by retrieving the registered job setting from the memory,
wherein when the job is currently executed in a background in a state that the job setting selection receiving unit does not receive the selection instruction for selecting the job setting of the job which is currently executed, the processor registers the job setting of the job in the memory as a provisional registered job setting,
in case that the job having the job setting registered in the memory as the provisional registered job setting is executed by retrieving the job setting from the memory before a predetermined time period elapses since the job setting is registered in the memory as the provisional registered job setting, the provisional registered job setting is registered in the memory as the registered job setting, and
in case that the job having the job setting registered in the memory as the provisional registered job setting is not executed by retrieving the job setting from the memory before the predetermined time period elapses since the job setting is registered in the memory as the provisional registered job setting, the provisional registered job setting is deleted from the memory.

11. The non-transitory computer-readable recording medium of claim 10, wherein the program causes the image processing apparatus to further function as:
a display unit; and
a display control unit to control the display unit so as to display selection information used for selecting the job setting when the job setting selection receiving unit receives the selection instruction.

12. The non-transitory computer-readable recording medium of claim 11, wherein at least one job of the plurality of jobs is a job associated with a scan operation for optically reading an original,
- the job setting selection receiving unit receives a display instruction for displaying the selection information relating the one job associated with the scan operation at least during a time period which elapses since the scan operation is finished until the one job is finished,
- the display control unit controls the display unit so as to display the selection information relating to the one job in accordance with the display instruction, and
- the processor registers the job setting of the one job in the memory when the job setting selection receiving unit receives the selection instruction for selecting the job setting of the one job from the selection information relating to the one job, which is displayed by the display unit.

13. The non-transitory computer-readable recording medium of claim 11, wherein the display control unit controls the display unit so as to display an indication for prompting a user to register the job setting of the job which is currently executed as the registered job setting when the image processing apparatus can receive a new job.

14. The non-transitory computer-readable recording medium of claim 11, wherein at least one job of the plurality of jobs is a job associated with a scan operation for optically reading an original,
- the display control unit controls the display unit so as to display a registration button for registering a job setting of the one job associated with the scan operation while the scan operation is in progress, and
- the job setting selection receiving unit receives the selection instruction by pushing the registration button.

15. The non-transitory computer-readable recording medium of claim 10, wherein the program causes the image processing apparatus to further function as:
- a job setting registration judging unit to judge whether the job setting is prohibited from being registered in the memory as the registered job setting, and to prohibit the job setting from being registered in the memory as the registered job setting when the job setting registration judging unit judges that the job setting is prohibited.

16. The non-transitory computer-readable recording medium of claim 10, wherein the program causes the image processing apparatus to further function as:
- a job execution unit to enable the plurality of jobs to be executed,
- wherein the job execution unit executes the job by retrieving the registered job setting from the memory and executes a second job by retrieving the registered job setting from the memory.

17. The non-transitory computer-readable recording medium of claim 16, wherein the job execution unit has two or more functions selected from among a copy function for copying an original in accordance with image data of the original, which is obtained by scanning the original, a print function for printing an image in accordance with image data transmitted from an external apparatus, and a facsimile function for transmitting the image data of the original, which is obtained by scanning the original.

18. The non-transitory computer-readable recording medium of claim 10, wherein the job setting selection receiving unit receives the selection instruction while the plurality of jobs are executed.

19. A method for registering a job setting, comprising:
- receiving a selection instruction for selecting a selected job setting to be registered as a registered job setting, from among job settings of a plurality of jobs which are currently executed by a predetermined image processing apparatus, wherein the job setting to be registered in the memory is for a first job among the plurality of jobs;
- storing the selected job setting in a registered job setting storing unit while the plurality of jobs are executed and in accordance with the received selection instruction,
  - wherein when the first job is currently executed in a background in a state that the job setting selection receiving unit does not receive the selection instruction for selecting the job setting of the first job which is currently executed, the registered job setting storing unit stores a job setting of the first job as a provisional registered job setting,
  - in case that the first job having the job setting stored as the provisional registered job setting is executed by retrieving the provisional registered job setting from the registered job setting storing unit before a predetermined time period elapses since storing the provisional registered job setting, the provisional registered job setting is stored as the registered job setting, and
  - in case that the first job having the job setting stored as the provisional registered job setting is not executed by retrieving the provisional registered job setting from the registered job setting storing unit before the predetermined time period elapses since storing the provisional registered job setting, the provisional registered job setting is deleted from the registered job setting storing unit; and
- setting the registered job setting stored in the registered job setting storing unit to a second job, the second job being different from the first job having the job setting registered in the memory.

20. The method of claim 19, wherein the selection instruction is received while the plurality of jobs are executed.

* * * * *